US012573384B2

(12) United States Patent
Tei et al.

(10) Patent No.: US 12,573,384 B2
(45) Date of Patent: Mar. 10, 2026

(54) DEVICE CONTROL SYSTEM

(71) Applicant: Daikin Industries, LTD., Osaka (JP)

(72) Inventors: Shimei Tei, Osaka (JP); Kenji Kita, Osaka (JP); Takeo Abe, Osaka (JP); Xianglian Li, Osaka (JP); Akiko Shirai, Osaka (JP); Naveen Gunturu, Osaka (JP); Makoto Ikeda, Osaka (JP); Tomomi Kukita, Osaka (JP); Kenji Amano, Osaka (JP); Yu Ota, Osaka (JP); Yuuichi Kita, Osaka (JP); Toshiyuki Maeda, Osaka (JP); Hisanori Ohshima, Osaka (JP); Tetsushi Tsuda, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 680 days.

(21) Appl. No.: 16/618,463

(22) PCT Filed: Jul. 13, 2018

(86) PCT No.: PCT/JP2018/026542
§ 371 (c)(1),
(2) Date: Dec. 2, 2019

(87) PCT Pub. No.: WO2019/013335
PCT Pub. Date: Jan. 17, 2019

(65) Prior Publication Data
US 2020/0126549 A1 Apr. 23, 2020

(30) Foreign Application Priority Data

Jul. 14, 2017 (JP) ................................ 2017-138570
Jul. 14, 2017 (JP) ................................ 2017-138576
May 1, 2018 (JP) ................................ 2018-088320

(51) Int. Cl.
*G10L 15/22* (2006.01)
*F24F 11/49* (2018.01)
(Continued)

(52) U.S. Cl.
CPC .............. *G10L 15/22* (2013.01); *F24F 11/49* (2018.01); *F24F 11/526* (2018.01); *F24F 11/64* (2018.01);
(Continued)

(58) Field of Classification Search
CPC ......... G10L 15/22; G10L 25/84; G10L 25/51; G10L 15/20; F24F 11/49; F24F 11/526; F24F 11/64; F24F 11/89
See application file for complete search history.

(56) References Cited

U.S. PATENT DOCUMENTS 5,602,337 A * 2/1997 Ishimoto ............. G01M 13/028
73/649
10,964,315 B1 * 3/2021 Wu ......................... G10L 15/16
(Continued)

FOREIGN PATENT DOCUMENTS

CN 1173331 C 10/2004
CN 106248415 A 12/2016
(Continued)

OTHER PUBLICATIONS

International Preliminary Report of corresponding PCT Application No. PCT/JP2018/026542 dated Jan. 23, 2020.
(Continued)

*Primary Examiner* — Richemond Dorvil
*Assistant Examiner* — Ethan Daniel Kim
(74) *Attorney, Agent, or Firm* — Spencer Fane LLP

(57) ABSTRACT
A management system (1090) includes an air conditioner (1062), a sound input unit (1064), an operation sound analyzing unit (1016), a first preprocessing unit (1011), a
(Continued)

command extracting unit (1014), and a control unit (1017). The sound input unit (1064) is provided in a room where the air conditioner is provided and obtains sound data (SD). The operation sound analyzing unit (1016) analyzes the sound data by a predetermined analysis method so as to obtain a determination result (RE) regarding whether an abnormality exists in the air conditioner or details of the abnormality. The first preprocessing unit (1011) performs first preprocessing on the sound data. The command extracting unit (1014) extracts a command (CM) of a user from the sound data that has been subjected to the first preprocessing. The control unit (1017) controls the air conditioner on the basis of the command.

7 Claims, 24 Drawing Sheets

(51) Int. Cl.

| | |
|---|---|
| *F24F 11/526* | (2018.01) |
| *F24F 11/64* | (2018.01) |
| *F24F 11/89* | (2018.01) |
| *G10L 15/20* | (2006.01) |
| *G10L 25/51* | (2013.01) |
| *G10L 25/84* | (2013.01) |

(52) U.S. Cl.
CPC .............. *F24F 11/89* (2018.01); *G10L 15/20* (2013.01); *G10L 25/51* (2013.01); *G10L 25/84* (2013.01); *G10L 2015/223* (2013.01)

(56) References Cited

U.S. PATENT DOCUMENTS

| | | | | |
|---|---|---|---|---|
| 2006/0126858 | A1* | 6/2006 | Larsen ..................... | G01H 7/00 |
| | | | | 381/104 |
| 2009/0030865 | A1 | 1/2009 | Sawada | |
| 2013/0268806 | A1* | 10/2013 | Park .................... | H04M 1/2155 |
| | | | | 714/15 |
| 2014/0303975 | A1 | 10/2014 | Ohmura et al. | |
| 2015/0120304 | A1 | 4/2015 | Yamashita et al. | |
| 2015/0287414 | A1 | 10/2015 | Tsujikawa | |
| 2016/0047568 | A1 | 2/2016 | Chan et al. | |
| 2016/0048143 | A1 | 2/2016 | Chan et al. | |
| 2016/0314782 | A1* | 10/2016 | Klimanis .............. | G10L 15/065 |
| 2016/0327921 | A1 | 11/2016 | Ribbich et al. | |
| 2018/0102914 | A1* | 4/2018 | Kawachi ............. | H04L 12/2807 |
| 2018/0122366 | A1* | 5/2018 | Nishikawa .............. | G06F 3/167 |
| 2018/0122376 | A1* | 5/2018 | Kojima ................... | G10L 15/22 |
| 2019/0206388 | A1* | 7/2019 | Aggarwal ............... | G10L 15/19 |
| 2019/0344365 | A1* | 11/2019 | Chan ....................... | B27B 27/10 |
| 2019/0355365 | A1* | 11/2019 | Kim ........................ | G10L 17/12 |
| 2020/0051554 | A1* | 2/2020 | Kim ........................ | G06F 3/167 |
| 2020/0175980 | A1* | 6/2020 | Li ............................ | G10L 15/30 |
| 2020/0412570 | A1* | 12/2020 | Takeda .................... | G10L 15/30 |

FOREIGN PATENT DOCUMENTS

| | | |
|---|---|---|
| CN | 106642547 A | 5/2017 |
| EP | 1 085 500 A2 | 3/2001 |
| JP | 6-27986 A | 2/1994 |
| JP | 2001-154694 A | 6/2001 |
| JP | 2001-285969 A | 10/2001 |
| JP | 2002-182688 A | 6/2002 |
| JP | 2003-319472 A | 11/2003 |
| JP | 2004-132683 A | 4/2004 |
| JP | 2005-147492 A | 6/2005 |
| JP | 2010-134367 A | 6/2010 |
| JP | 2012-112570 A | 6/2012 |
| JP | 2015-111253 A | 6/2015 |
| JP | 2016-42018 A | 3/2016 |
| JP | 5963155 B1 | 7/2016 |

OTHER PUBLICATIONS

International Search Report of corresponding PCT Application No. PCT/JP2018/026542 dated Sep. 25, 2018.

European Search Report of corresponding EP Application No. 18 83 1043.7 dated Jun. 2, 2021.

European Search Report of corresponding EP Divisional Application No. 24 16 0490.9 dated Mar. 28, 2024.

European Search Report of corresponding EP Divisional Application No. 24 16 0502.1 dated Mar. 28, 2024.

\* cited by examiner

DEVICE CONTROL SYSTEM

TECHNICAL FIELD

The present disclosure relates to a device control system.

BACKGROUND ART

PTL 1 (Japanese Unexamined Patent Application Publication No. 2001-285969) discloses a remote controller that controls a device such as an air conditioner in accordance with a user's speech command.

PTL 2 (Japanese Patent No. 5963155) discloses a system that measures a noise level of a piece of real estate by using a robot and presents it to an applicant for occupation.

PTL 3 (Japanese Unexamined Patent Application Publication No. H06-027986) discloses a device control system using a voice recognition apparatus that can respond an emergency by an operator merely speaking aloud.

SUMMARY OF THE INVENTION

Technical Problem

A microphone of a remote controller is typically designed to be specialized in detecting a human voice and thus is not always suitable for analyzing an operation sound of an air conditioner in terms of frequency characteristics and the like. In addition, in many cases, a measurement target of a robot to be used for evaluation of a piece of real estate is merely a noise level (sound volume). Furthermore, a device control system of the related art that can respond an emergency has nothing to do with contents of speech, and thus, in some cases, appropriate abnormality processing is not executed.

A first object is to provide a management system that can detect or predict an abnormality on the basis of an operation sound of an air conditioner that accepts a speech command.

A second object is to provide information regarding a room on the basis of sound measurement in a more useful manner than before.

A third object is to perform appropriate abnormality processing on the basis of contents of speech.

Solution to Problem

[First Configuration]

A management system according to a first aspect includes an air conditioner, a sound input unit, an operation sound analyzing unit, a first preprocessing unit, a command extracting unit, and a control unit. The sound input unit is provided in a room where the air conditioner is provided and obtains sound data. The operation sound analyzing unit analyzes an operation sound included in the sound data by a predetermined analysis method so as to obtain a determination result regarding whether an abnormality exists in the air conditioner or details of the abnormality. The first preprocessing unit performs first preprocessing on the sound data. The command extracting unit extracts a command of a user from the sound data that has been subjected to the first preprocessing. The control unit controls the air conditioner on the basis of the command.

With this configuration, the sound data received by the command extracting unit is subjected to the first preprocessing, while the sound data transferred to the operation sound analyzing unit is not subjected to the first preprocessing. Thus, since the sound data having different characteristics from those of the sound data for the command extracting unit can be transferred to the operation sound analyzing unit, the management system is suitable for analyzing the operation sound for abnormality detection.

A management system according to a second aspect is the management system according to the first aspect in which the first preprocessing unit extracts a component related to a frequency band of a human voice from the sound data.

With this configuration, the sound data transferred to the operation sound analyzing unit is not subjected to the first preprocessing for extracting the component related to the frequency band of the human voice. Thus, the operation sound analyzing unit can receive the sound data that is more suitable for analysis.

A management system according to a third aspect is the management system according to the second aspect further including an operation sound data accumulating unit that accumulates the operation sound. The operation sound analyzing unit analyses data of the operation sound previously accumulated in the operation sound data accumulating unit and data of the most recent operation sound so as to obtain the determination result.

With this configuration, the accumulated operation sound data is analyzed so as to determine whether an abnormality exists in the current operation sound or its details. Thus, the accuracy of abnormality detection is further improved.

A management system according to a fourth aspect is the management system according to the third aspect further including a second preprocessing unit that performs second preprocessing on the sound data. The second preprocessing unit extracts the operation sound from the sound data, and the operation sound data accumulating unit accumulates the operation sound extracted by the second preprocessing unit.

With this configuration, the sound data accumulated in the operation sound data accumulating unit is subjected to the second preprocessing for removing the component related to the frequency band of the human voice. Thus, since sound data from which noise other than the operation sound of the air conditioner is removed is analyzed, the accuracy of abnormality detection is improved.

A management system according to a fifth aspect is the management system according to any one of the first to fourth aspects in which the sound input unit further includes a sound gate unit that transmits or blocks the sound data. Upon recognition of a predetermined keyword spoken by the user, the sound gate unit allows the sound data to pass therethrough for a predetermined period.

With this configuration, functional blocks including the command extracting unit cannot perform a meaningful operation until a keyword is spoken. Thus, since it is possible to make at least a part of the functional blocks remain in a sleep state before a keyword is spoken, the consumption of a processing capability is suppressed.

A management system according to a sixth aspect is the management system according to any one of the third to fifth aspects in which the predetermined analysis method is selected from among a plurality of analysis methods on the basis of at least one of a command, the number of years the air conditioner has been used, and the model of the air conditioner.

With this configuration, from among a plurality of analysis methods, an optimal analysis method is selected on the basis of the command, the number of years, the model, and the like. Thus, the accuracy of abnormality detection is further improved.

A management system according to a seventh aspect is the management system according to any one of the third to sixth aspects having a command obtaining mode and an operation sound obtaining mode. In the command obtaining mode, a command is obtained from the user's voice included in the sound data. In the operation sound obtaining mode, an operation sound of the air conditioner included in the sound data is obtained.

With this configuration, the management system has two modes, which are the command obtaining mode and the operation sound obtaining mode. Thus, as long as no command is obtained, various kinds of the operation sound data can be accumulated.

A management system according to an eighth aspect is the management system according to any one of the third to seventh aspects in which one command is an operation sound obtaining command for obtaining the operation sound data from the air conditioner. In a case where the command extracting unit extracts the operation sound obtaining command, the operation sound data accumulating unit accumulates the operation sound data over a predetermined period of time.

With this configuration, the operation sound data is accumulated in accordance with the user's or serviceman's intention. Thus, the user or serviceman can supplement the operation sound data or check the operation of the management system.

A management system according to a ninth aspect is the management system according to any one of the third to eighth aspects in which the control unit causes the operation sound data accumulating unit to accumulate the operation sound data on a regular basis.

With this configuration, the operation sound data is accumulated on a regular basis. Thus, since various kinds of information that can be used for analysis are obtained, the accuracy of abnormality detection is improved.

A management system according to a tenth aspect is the management system according to any one of the third to ninth aspects in which the operation sound data accumulating unit accumulates the operation sound data in association with the command extracted by the command extracting unit. The operation sound analyzing unit elicits the determination result by using the command.

With this configuration, the operation sound data and the command are associated with each other. Thus, since the relationship between an operation that is intended by the user to be performed by the air conditioner and the operation sound can be obtained, the accuracy of abnormality detection is further improved.

A management system according to an eleventh aspect is the management system according to any one of the third to tenth aspects in which the operation sound data accumulating unit further accumulates the operation sound data in association with operation information transferred from the air conditioner. The operation sound analyzing unit elicits the determination result by using the operation information.

With this configuration, the operation sound data and the operation information are associated with each other. The operation information herein means a sensed state of each portion, an posture of an actuator, or the like in the air conditioner in operation. Thus, since the relationship between the state of the air conditioner and the operation sound can be obtained, the accuracy of abnormality detection is further improved.

A management system according to a twelfth aspect is the management system according to any one of the third to eleventh aspects further including an output unit that is controlled by the control unit. The control unit causes the output unit to issue a notification of countermeasures to be taken by the user on the basis of details of the abnormality related to the determination result.

With this configuration, in a case where an abnormality occurs in the air conditioner, the user can hear countermeasures from the output unit. Thus, the usability of the air conditioner is increased.

A management system according to a thirteenth aspect is the management system according to any one of the third to twelfth aspects further including a service center terminal. The determination result is transmitted from the operation sound analyzing unit to the service center terminal.

With this configuration, the service center terminal can receive the determination result. Thus, since the serviceman can understand that an abnormality occurs in the air conditioner, maintenance can be carried out immediately.

A management system according to a fourteenth aspect is the management system according to any one of the third to thirteenth aspects in which the air conditioner is a plurality of air conditioners. Each of the plurality of air conditioners has a different identification number. In the operation sound data accumulating unit, a piece of operation sound data is stored in association with the identification number corresponding to the piece of operation sound data.

With this configuration, the operation sound data of the plurality of air conditioners is accumulated. Thus, an abnormality in the plurality of air conditioners is likely to be found.

[Second Configuration]

An information providing system according to a fifteenth aspect is an information providing system that provides information regarding a room. The information providing system includes a measurement unit, a data processing unit, and an information generating unit. The measurement unit measures a sound in the room. The data processing unit analyses data of the sound measured by the measurement unit and extracts a first sound. The first sound is a voice spoken by a person in the room and/or is a sound due to an action of the person in the room. The information generating unit generates the information regarding the room on the basis of a result of processing by the data processing unit and by using at least information regarding the first sound.

The sound measured in the room is analyzed by the data processing unit herein. Subsequently, by using the information regarding the first sound extracted by the data processing unit, the information generating unit generates information regarding the room. Since the generated information is generated by using the information regarding the first sound that is the voice spoken by the person in the room and/or the sound due to the action of the person in the room, for example, it is possible to determine whether the person in the room is preferable in terms of noise.

In a case where the information regarding the room is generated also by using a sound other than the first sound, for example, it is possible to remove the influence of noise that is not produced by the person in the room and to generate an evaluation regarding the noise of the person in the room.

Note that examples of the first sound include a voice of a resident of the room, a voice of a guest who stays in a room of a hotel, a sound of stepping of the person in the room, a sound such as music from a television or audio equipment the volume of which is turned up by the person in the room, a sound of a washing machine or cleaner operated by the person in the room, and the like.

In addition, examples of the information regarding the first sound include the volume of the voice of the person in the room, the volume of the sound of stepping of the person in the room, the volume of the sound from the television or audio equipment, the volume of the sound of the washing machine or cleaner, the volume of the voice of the person or a sound of a device according to time slot, information of a sound source and a person who produces the sound, and the like.

In addition, examples of the information regarding the room include evaluation information regarding noise of a renter of an apartment, a guest of a hotel, an inpatient of a hospital, and the like, evaluation information regarding noise of rooms of the apartment including noise of residents, noise evaluation information regarding a building of the apartment based on the evaluation information of the rooms, and the like.

An information providing system according to a sixteenth aspect is the information providing system according to the fifteenth aspect further including a device operating unit and a storage unit. The device operating unit causes a device in the room to operate in response to a command from the person in the room. The storage unit stores the command received by the device operating unit. The data processing unit recognizes a sound produced by the device that is caused to operate in response to the command from the person in the room on the basis of a time at which the sound was measured by the measurement unit and a time of the command stored in the storage unit.

Herein, the command received by the device operating unit is stored in the storage unit, and the sound produced by the device is recognized on the basis of the time of the command and the time at which the sound was measured. The data processing unit that performs this processing can distinguish the sound produced by the device more accurately from other sounds. Thus, according to the present invention, the accuracy of the information regarding the first sound is increased, and the information regarding the room is more useful.

An information providing system according to a seventeenth aspect is the information providing system according to the fifteenth or sixteenth aspect in which the first sound is the voice spoken by the person in the room and the sound due to the action of the person in the room. The data processing unit further separates the first sound into the voice spoken by the person in the room and the sound due to the action of the person in the room.

Herein, for example, in a case where information regarding whether the person in the room is preferable in terms of noise is generated as the information regarding the room, it is possible to include information regarding whether the voice of the person in the room is loud or whether the noise of the device operated by the person in the room is loud.

An information providing system according to an eighteenth aspect is the information providing system according to any one of the fifteenth to seventeenth aspects in which the measurement unit is provided in each of a plurality of rooms. The information generating unit is provided outside the rooms. The information generating unit generates, as the information regarding the first sound, information of an evaluation regarding noise of the rooms or a building including the rooms or information of an evaluation regarding occurrence of noise of the person in the room.

Herein, the information generating unit can collect data of sounds from a large number of rooms. Since the information regarding the first room in the rooms is collected, more useful information can be provided.

Note that the measurement unit provided in each of the rooms preferably includes a sound collecting microphone. For example, it is assumed that the microphone is incorporated in an indoor unit of an air conditioner provided in the ceiling or a side wall, incorporated in a lighting device, or placed on a desk or shelf in a room as a mobile microphone-including device.

An information providing system according to a nineteenth aspect is the information providing system according to the eighteenth aspect in which the information generating unit causes an information terminal to present the evaluation information. The information terminal is owned by a manager of the room or building or the person in the room.

Herein, an owner of the room, a manager who is a management agent, or a renter of the room can obtain the evaluation information from the information generating unit and check it on the information terminal. Thus, for example, an owner who runs a rental apartment can know an evaluation regarding noise of the renter who rents the room, and can give caution to the renter in order to stop the noise for the neighbors of the room. In addition, the following advantage can be expected. For example, if the renter who wishes to newly rent the room obtains their previous evaluation history regarding noise and presents it to a lender of the next room so as to rent the room with ease.

An information providing system according to a twentieth aspect is an information providing system that provides information regarding a room. The information providing system includes a measurement unit, a data processing unit, and an information generating unit. The measurement unit measures a sound in the room. The data processing unit analyzes data of the sound measured by the measurement unit. The information generating unit generates the information regarding the room on the basis of a result of processing by the data processing unit.

Herein, the data processing unit analyzes the sound measured in the room. In addition, the information generating unit generates the information regarding the room. By using the generated information, for example, it is possible to determine whether the person in the room is preferable in terms of noise.

[Third Configuration]

A device according to a twenty-first aspect accepts a control command from an information processing apparatus that outputs the control command in accordance with a sound input obtained through a sound input accepting apparatus. The device includes an accepting unit and an abnormality processing executing unit. The accepting unit accepts an abnormality processing command corresponding to an abnormal sound produced in a space where the sound input accepting apparatus is provided. The abnormality processing executing unit executes abnormality processing in accordance with the abnormality processing command. With such a configuration, it is possible to provide a device that is set in an optimal state in case of an abnormality.

An abnormality processing system according to a twenty-second aspect includes a sound input accepting apparatus and a device. The sound input accepting apparatus accepts sound input. The device accepts a control command from an information processing apparatus that outputs the control command in accordance with the sound input obtained through the sound input accepting apparatus. In addition, the device includes an accepting unit and an abnormality processing executing unit. The accepting unit accepts an abnormality processing command corresponding to an abnormal sound produced in a space where the sound input accepting apparatus is provided. The abnormality processing executing unit executes abnormality processing in accordance with the abnormality processing command. With such a configuration, it is possible to provide an abnormality processing system that sets the device in an optimal state in case of an abnormality.

An abnormality processing system according to a twenty-third aspect is the abnormality processing system according to the twenty-second aspect in which the sound input accepting apparatus is incorporated in the device. With such a configuration, it is possible to provide a device that can be controlled by sound input.

An abnormality processing system according to a twenty-fourth aspect is the abnormality processing system according to the twenty-second or twenty-third aspect further including an information processing apparatus that outputs a control command in accordance with the sound input obtained through the sound input accepting apparatus. With such a configuration, a highly accurate sound analysis can be performed.

An abnormality processing system according to a twenty-fifth aspect is the abnormality processing system according to any one of the twenty-second to twenty-fourth aspects in which the information processing apparatus includes an abnormal sound determining unit and a transmission unit. The abnormal sound determining unit determines a predetermined abnormal sound from sound information obtained through the sound input accepting apparatus. The transmission unit transmits an abnormality processing command corresponding to the abnormal sound to the device. With such a configuration, it is possible to perform a highly accurate analysis on the sound information to transmit the abnormality processing command.

An abnormality processing system according to a twenty-sixth aspect is the abnormality processing system according to the twenty-fifth aspect in which the abnormal sound determining unit excludes predetermined sound information from the abnormal sound as an excluded sound. With such a configuration, malfunctioning can be avoided.

An abnormality processing system according to a twenty-seventh aspect is the abnormality processing system according to any one of the twenty-second to twenty-sixth aspects in which the sound input accepting apparatus can be switched to a suspended state in which transmission of the sound information corresponding to the sound input is suspended. In addition, even in the suspended state, if predetermined sound information is obtained, the sound input accepting apparatus transmits the obtained sound information to the information processing apparatus. With such a configuration, it is possible to provide an abnormality processing system that is appropriately operated in case of an abnormality.

An abnormality processing system according to a twenty-eighth aspect is the abnormality processing system according to any one of the twenty-second to twenty-sixth aspects in which the sound input accepting apparatus includes an accepting-side determination unit and an accepting-side transmission unit. The accepting-side determination unit determines predetermined abnormal sound information from obtained sound information. The accepting-side transmission unit transmits an abnormality processing command corresponding to the determined abnormal sound. With such a configuration, an abnormality processing system with a simple configuration can be provided.

An abnormality processing system according to a twenty-ninth aspect is the abnormality processing system according to any one of the twenty-second to twenty-sixth aspects in which the device can be switched to a stopped state in which acceptance of the control command is stopped. In addition, even in the stopped state, in a case where an abnormality processing command is accepted, the device executes abnormality processing. With such a configuration, it is possible to provide an abnormality processing system that is appropriately operated in case of an abnormality.

BRIEF DESCRIPTION OF THE DRAWINGS

[First Configuration]

FIG. 5 is a schematic diagram of the management system 90 according to a second modification of the first embodiment of the first configuration.

[Second Configuration]

Figure 9:
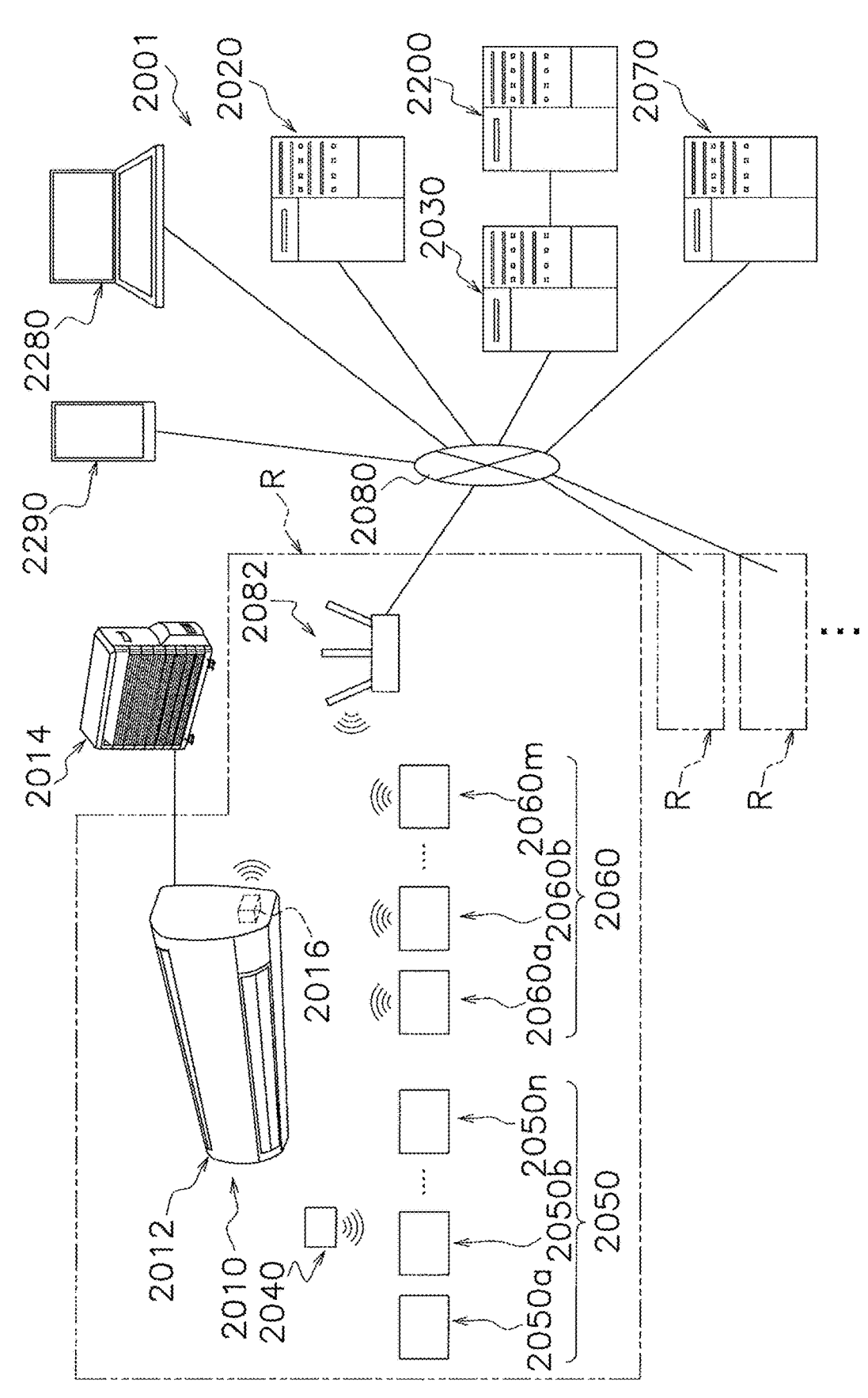

FIG. 9 schematically illustrates the configuration of a device control system including an information providing system according to an embodiment of a second configuration.

Figure 10:
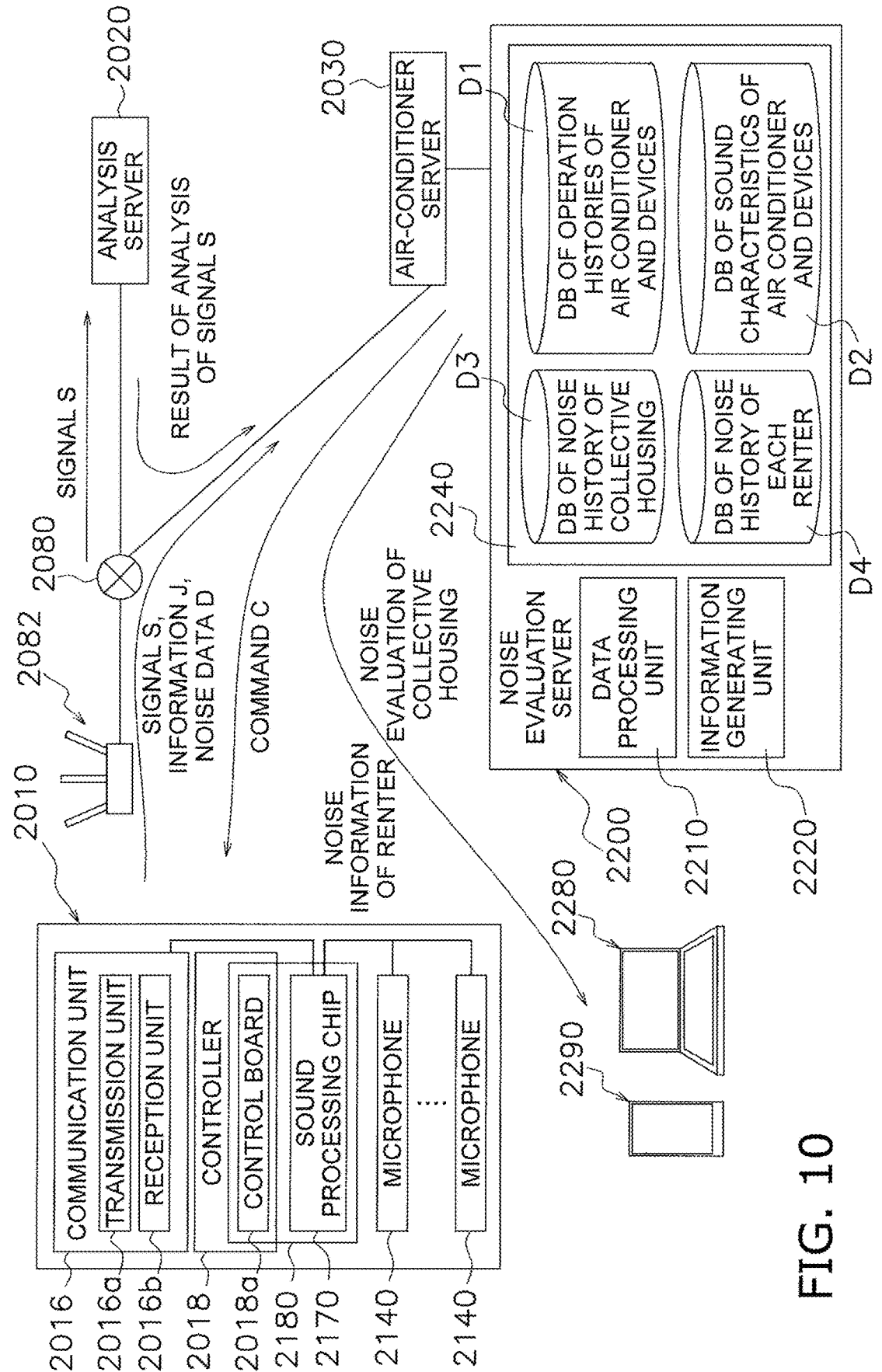

FIG. 10 is a block diagram of control of the device control system.

Figure 11:
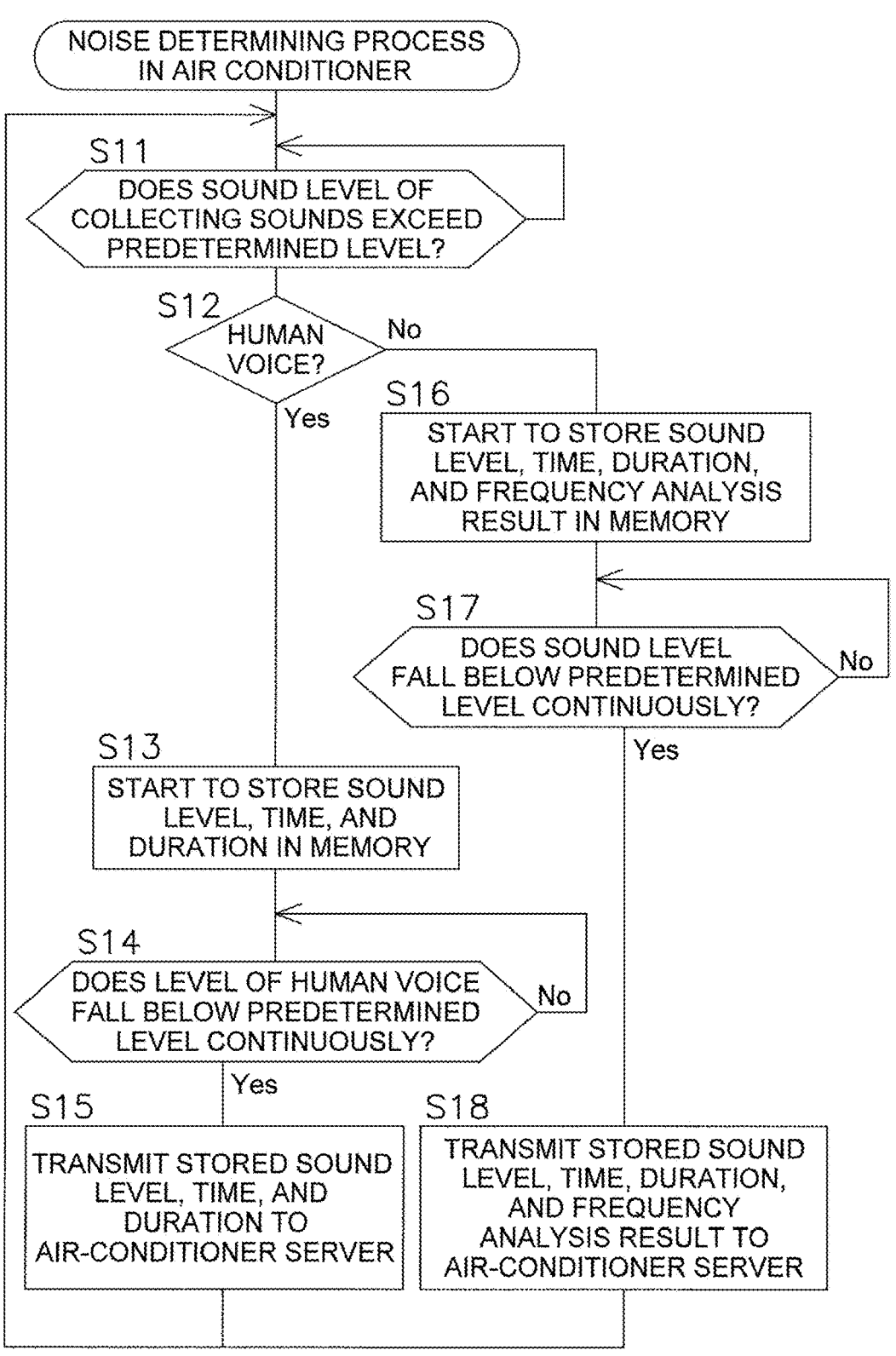

FIG. 11 is a flow illustrating a noise determining process in an air conditioner.

Figure 12:
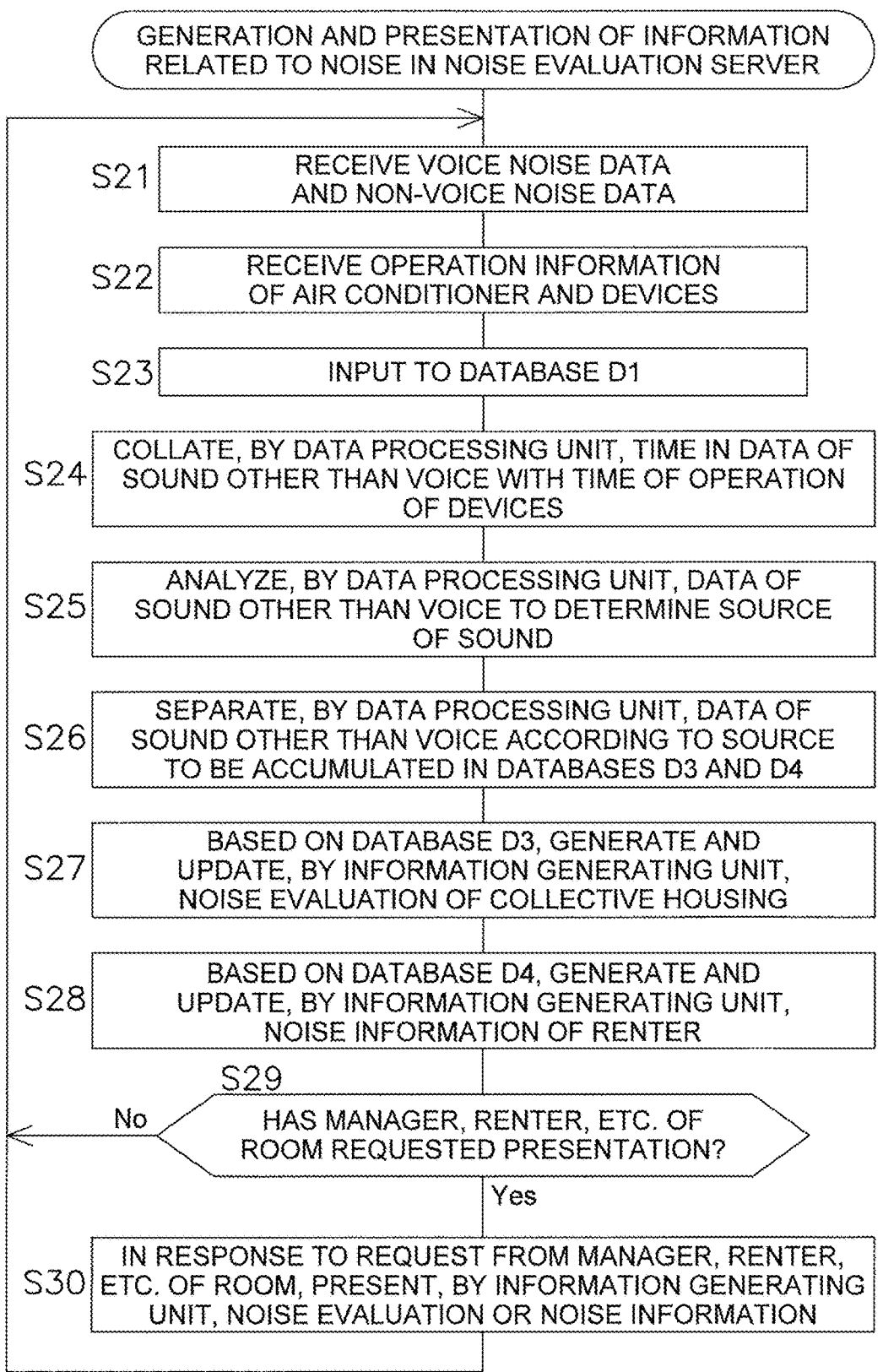

FIG. 12 is a flow illustrating generation and presentation of information related to noise in a noise evaluation server.

[Third Configuration]

Figure 13:
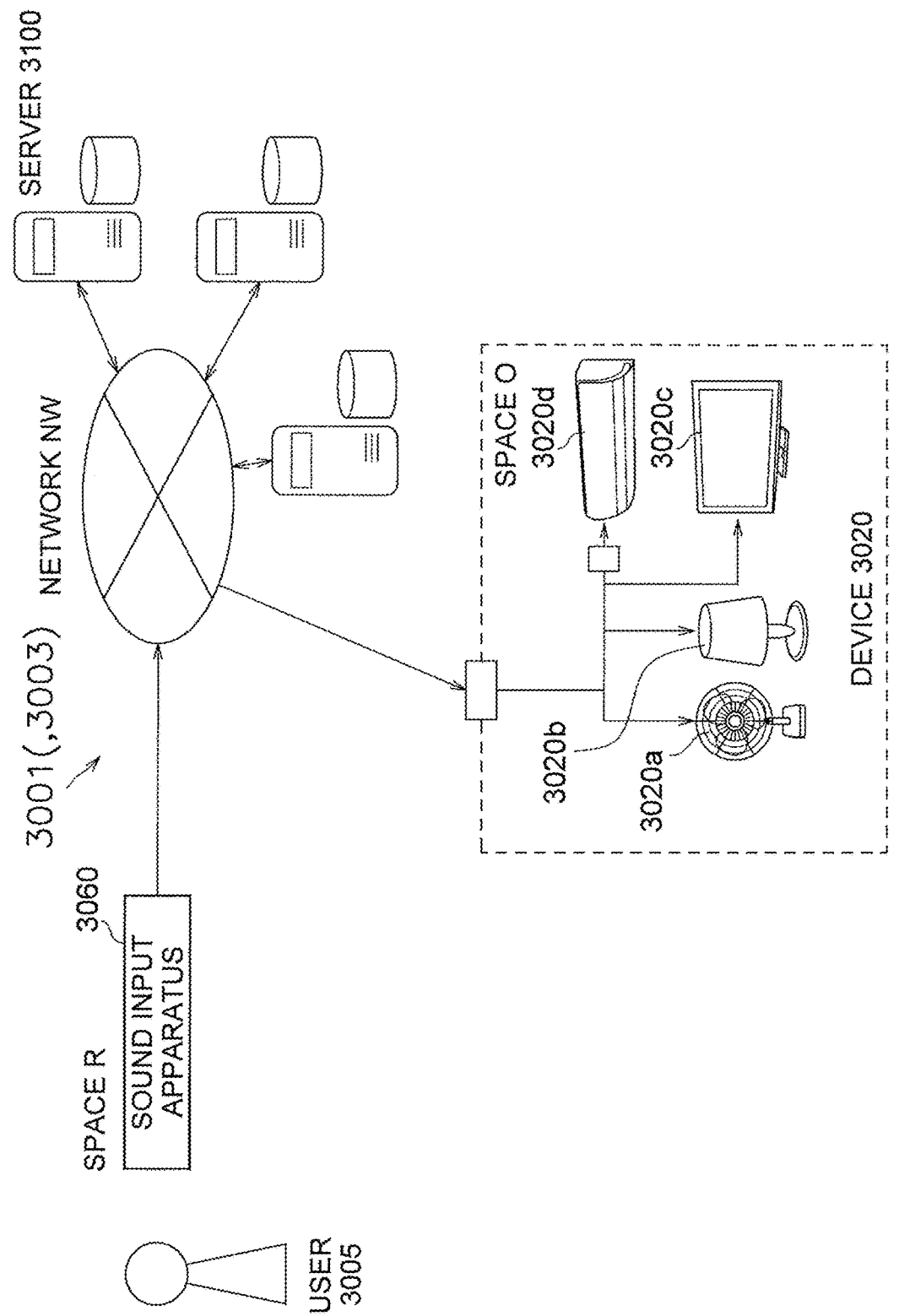

FIG. 13 is a schematic diagram illustrating a concept of a device control system 3001 and an abnormality processing system 3003 according to a first embodiment of a third configuration.

Figure 14:
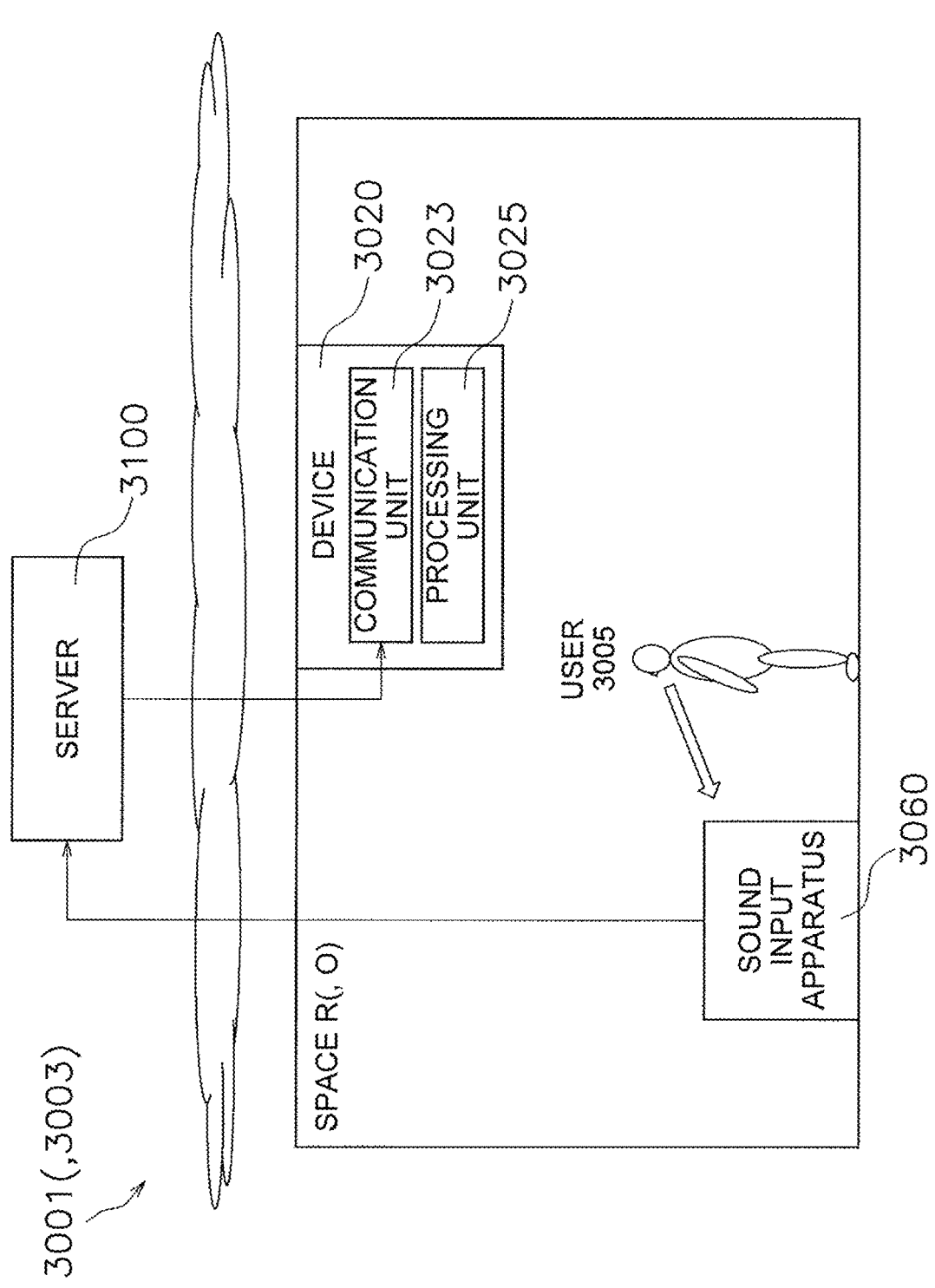

FIG. 14 is a schematic diagram illustrating the configuration of the device control system 3001 and the abnormality processing system 3 according to the same embodiment.

Figure 15:
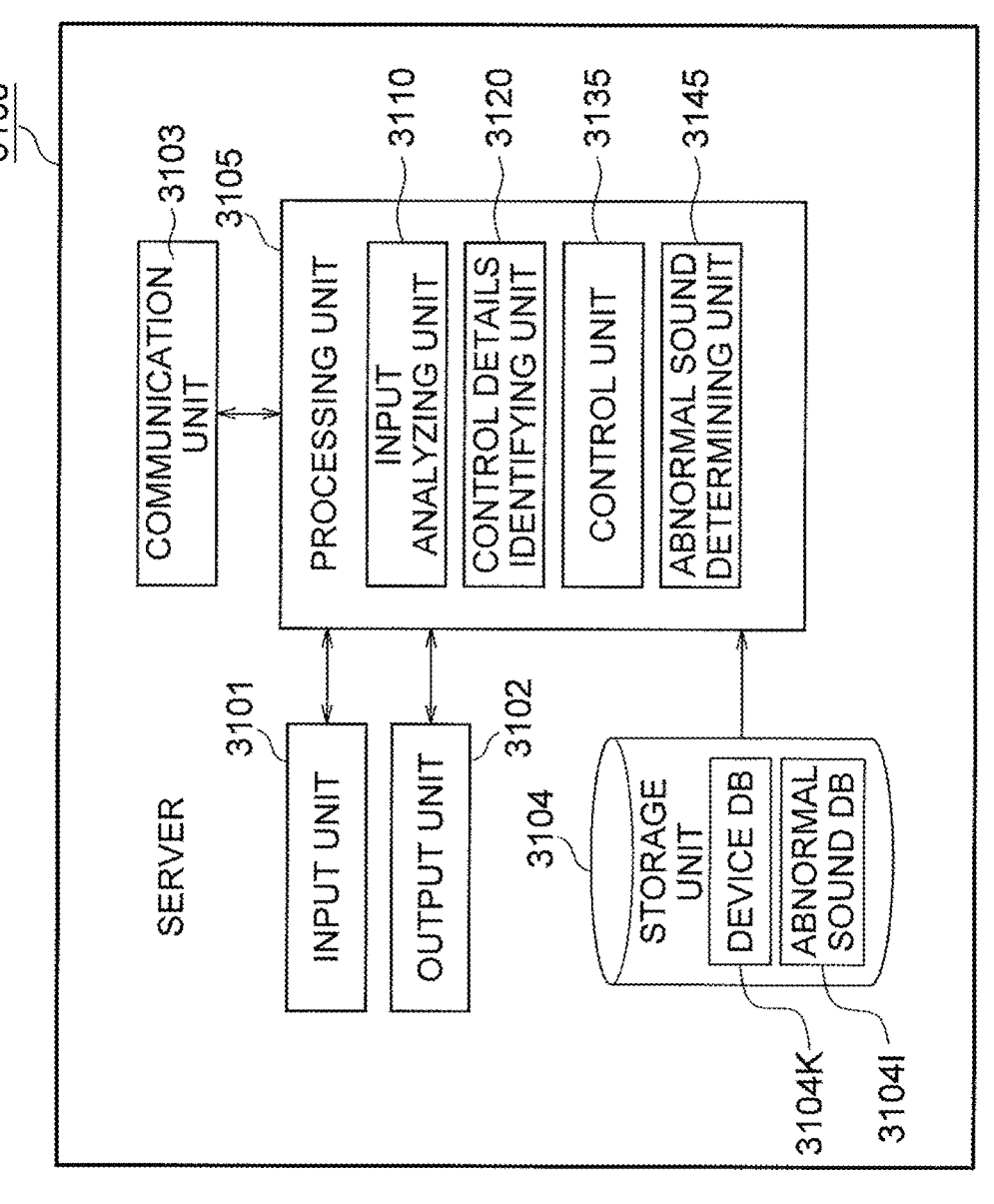

FIG. 15 is a schematic diagram illustrating the configuration of an information processing apparatus 3100 according to the same embodiment.

Figure 16:
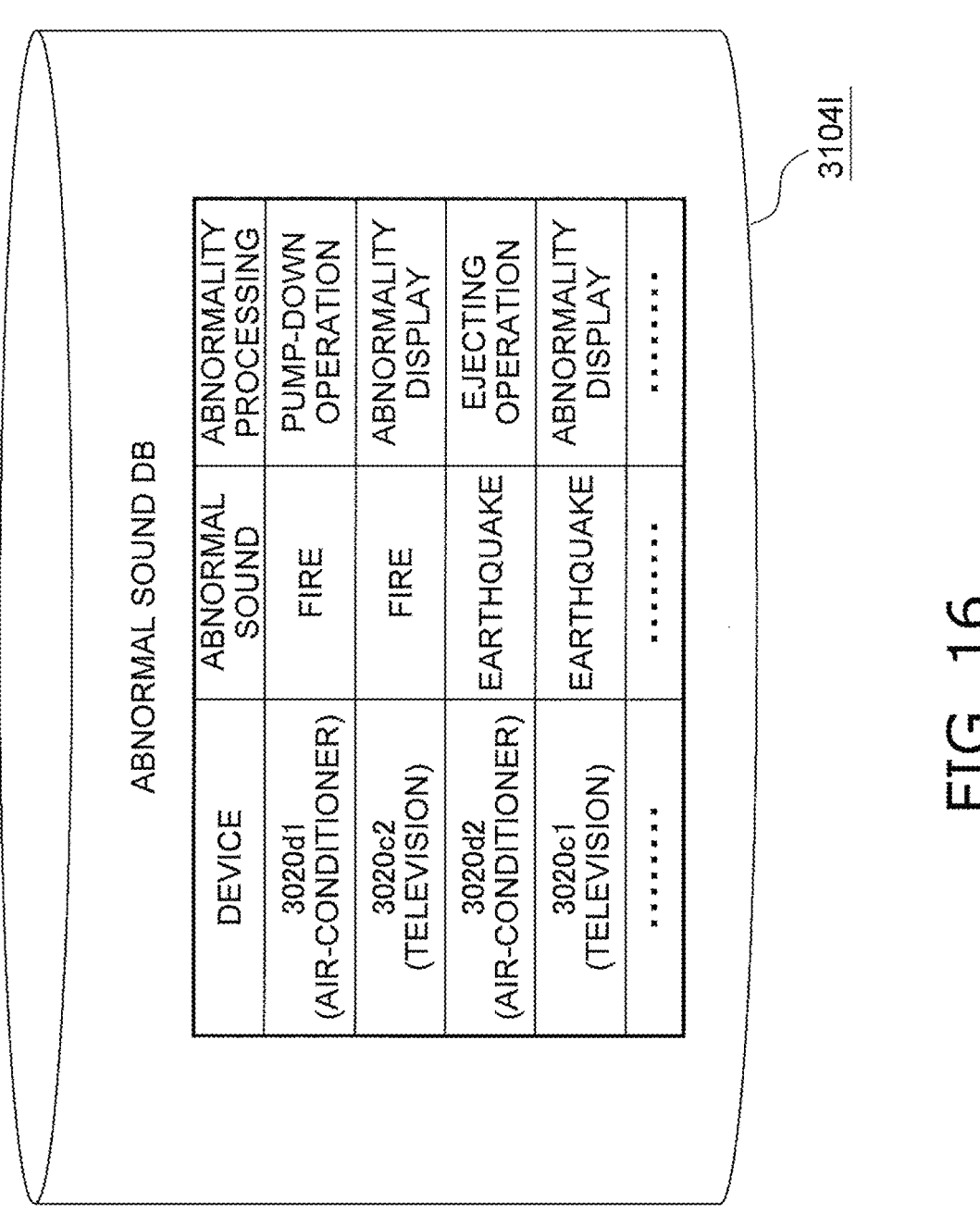

FIG. 16 is a schematic diagram illustrating the configuration of an abnormal sound DB 31041 according to the same embodiment.

Figure 17:
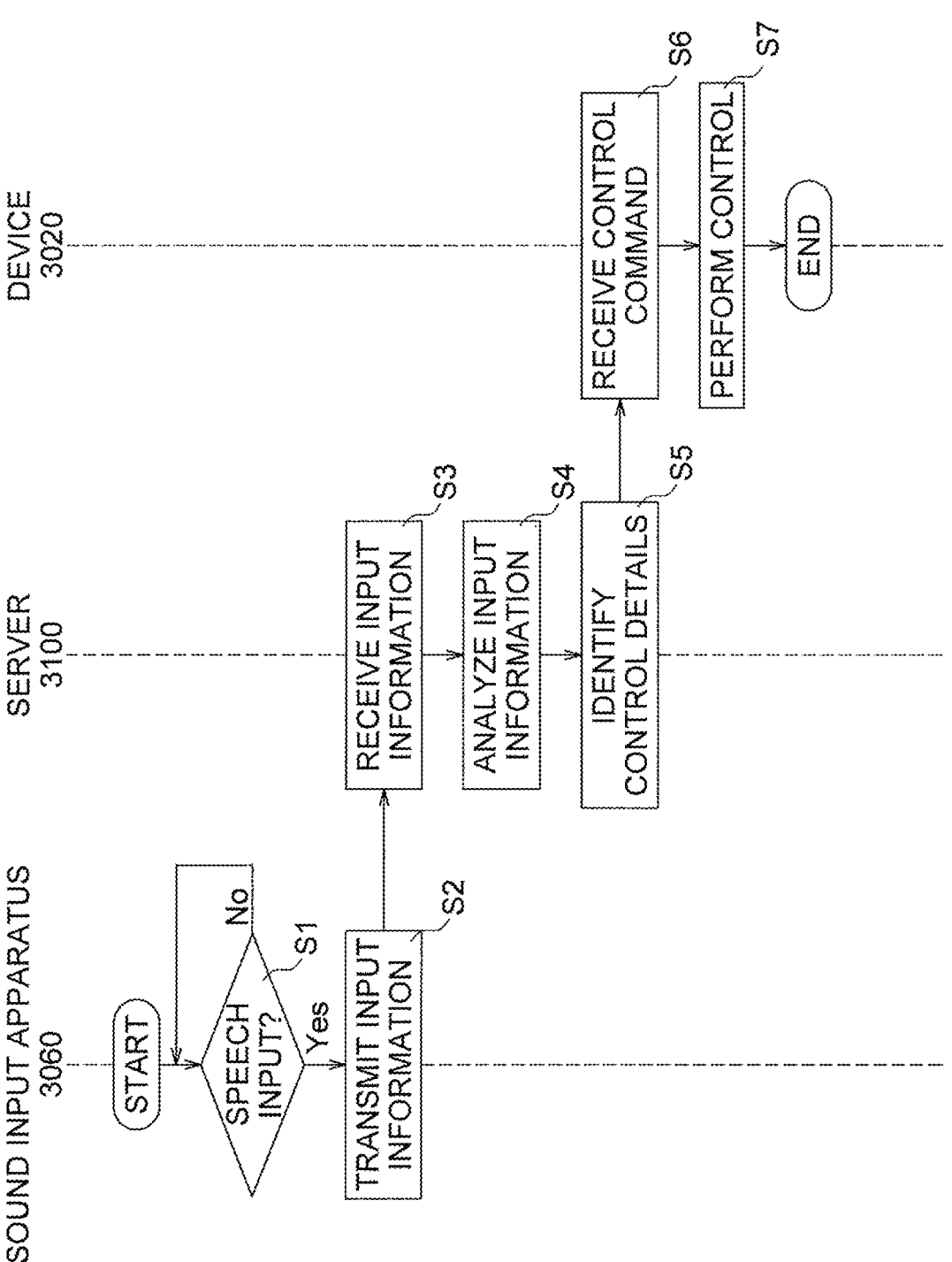

FIG. 17 is a sequence diagram illustrating operations of the device control system 3001 according to the same embodiment.

Figure 18:
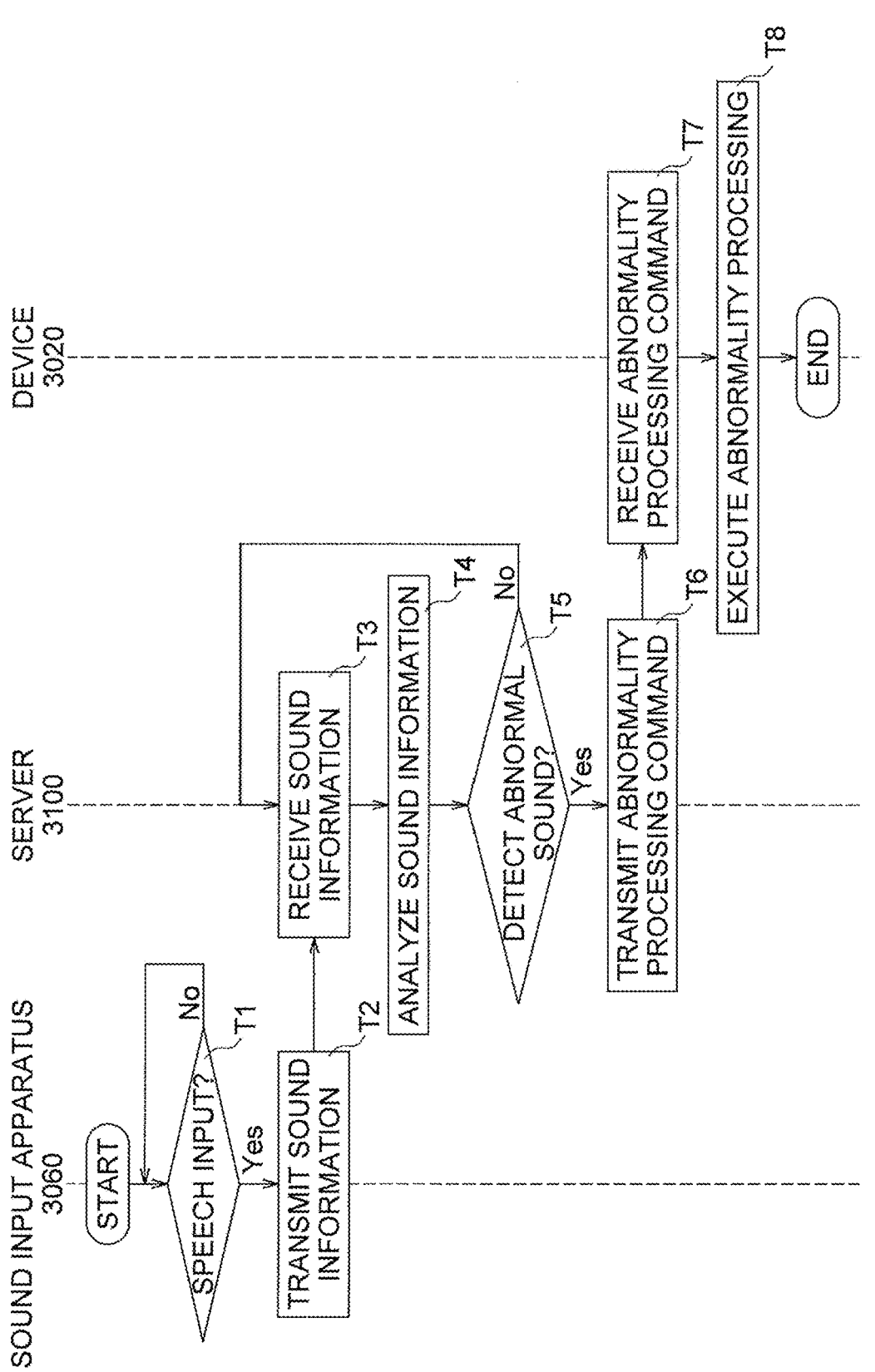

FIG. 18 is a sequence diagram illustrating operations of the abnormality processing system 3003 according to the same embodiment.

Figure 19:
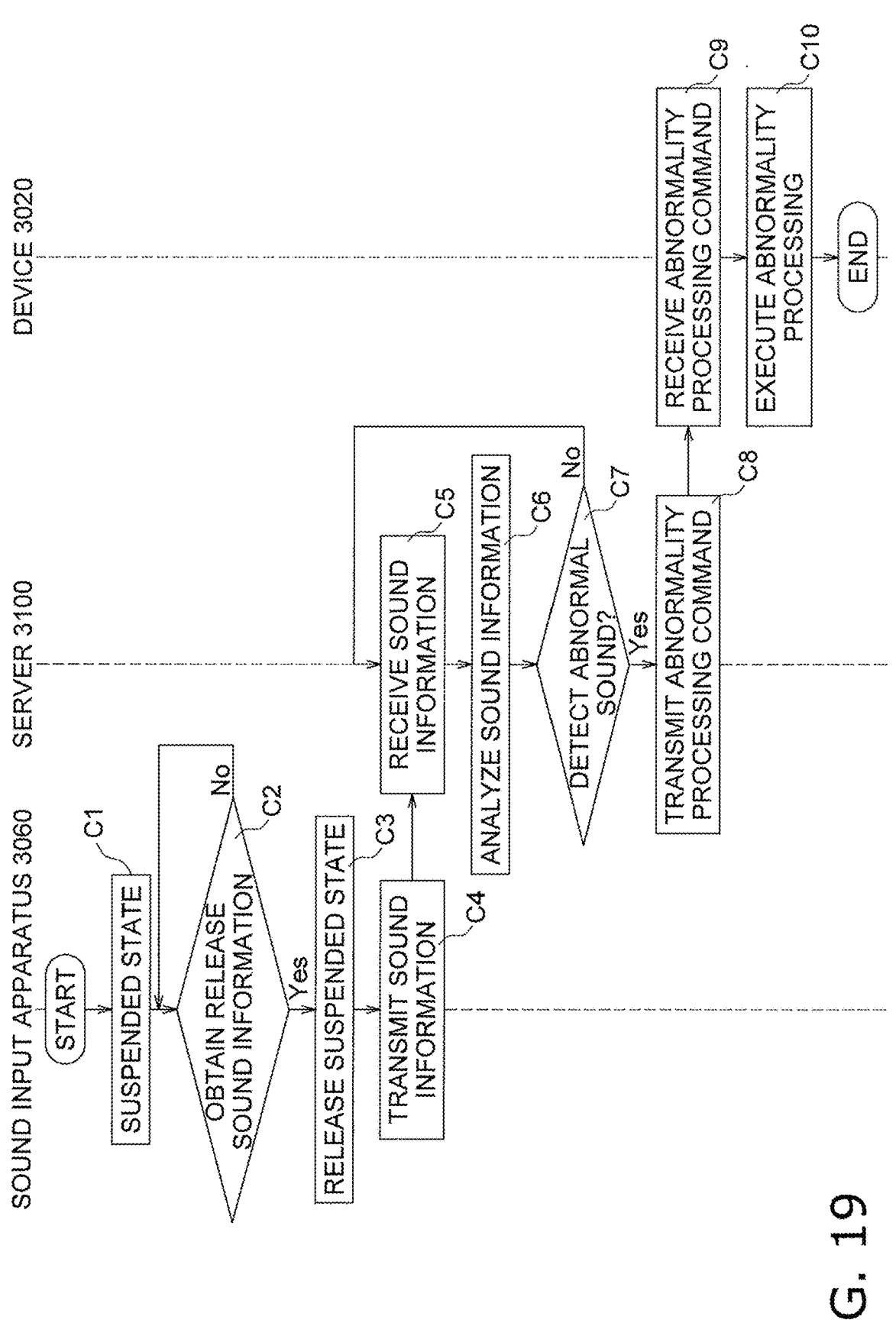

FIG. 19 is a sequence diagram illustrating operations of the abnormality processing system 3003 according to Modification C.

Figure 20:
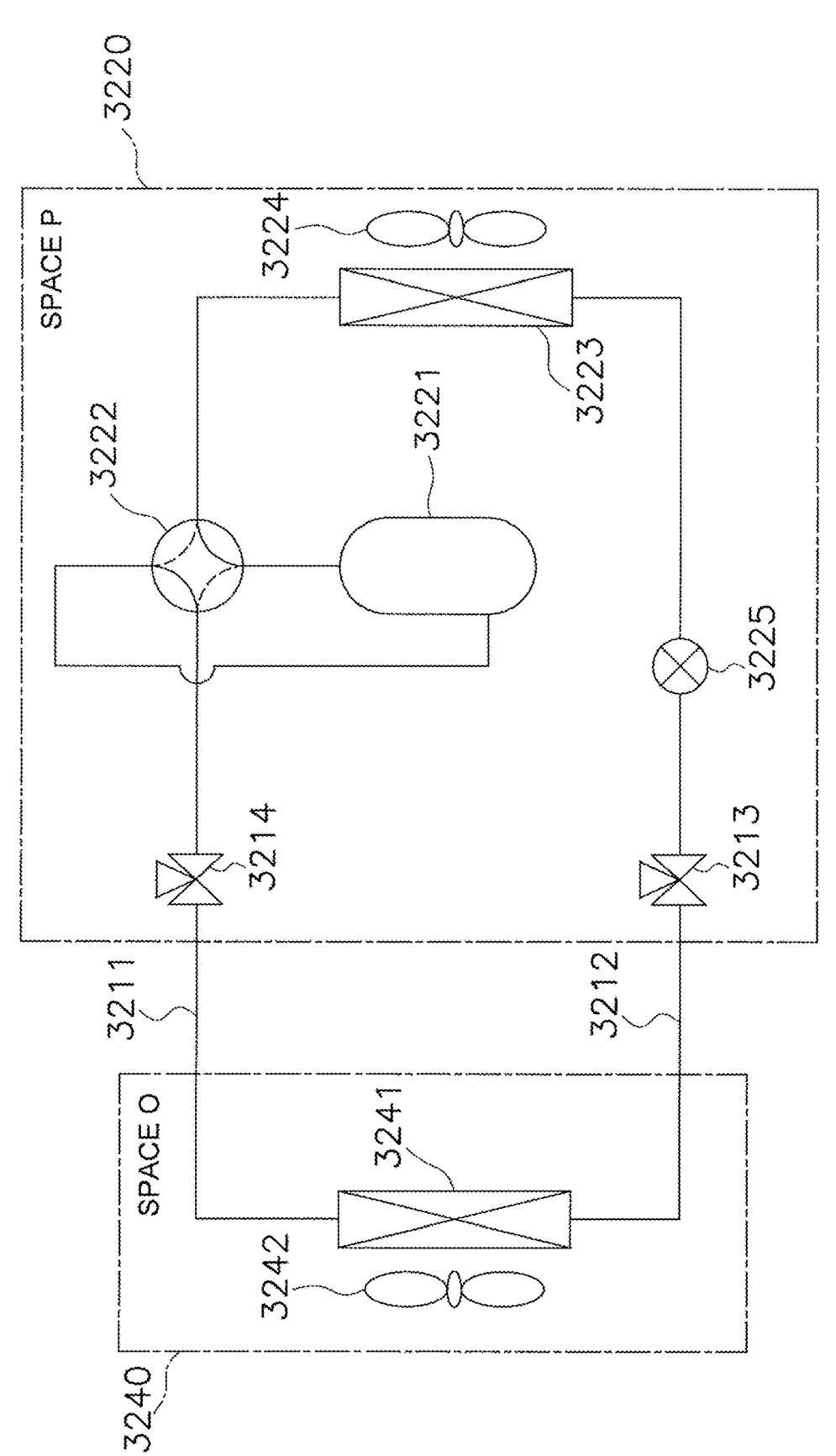

FIG. 20 is a schematic diagram illustrating the configuration of a refrigerant cycle used in Application Examples 1 and 2.

Figure 21:
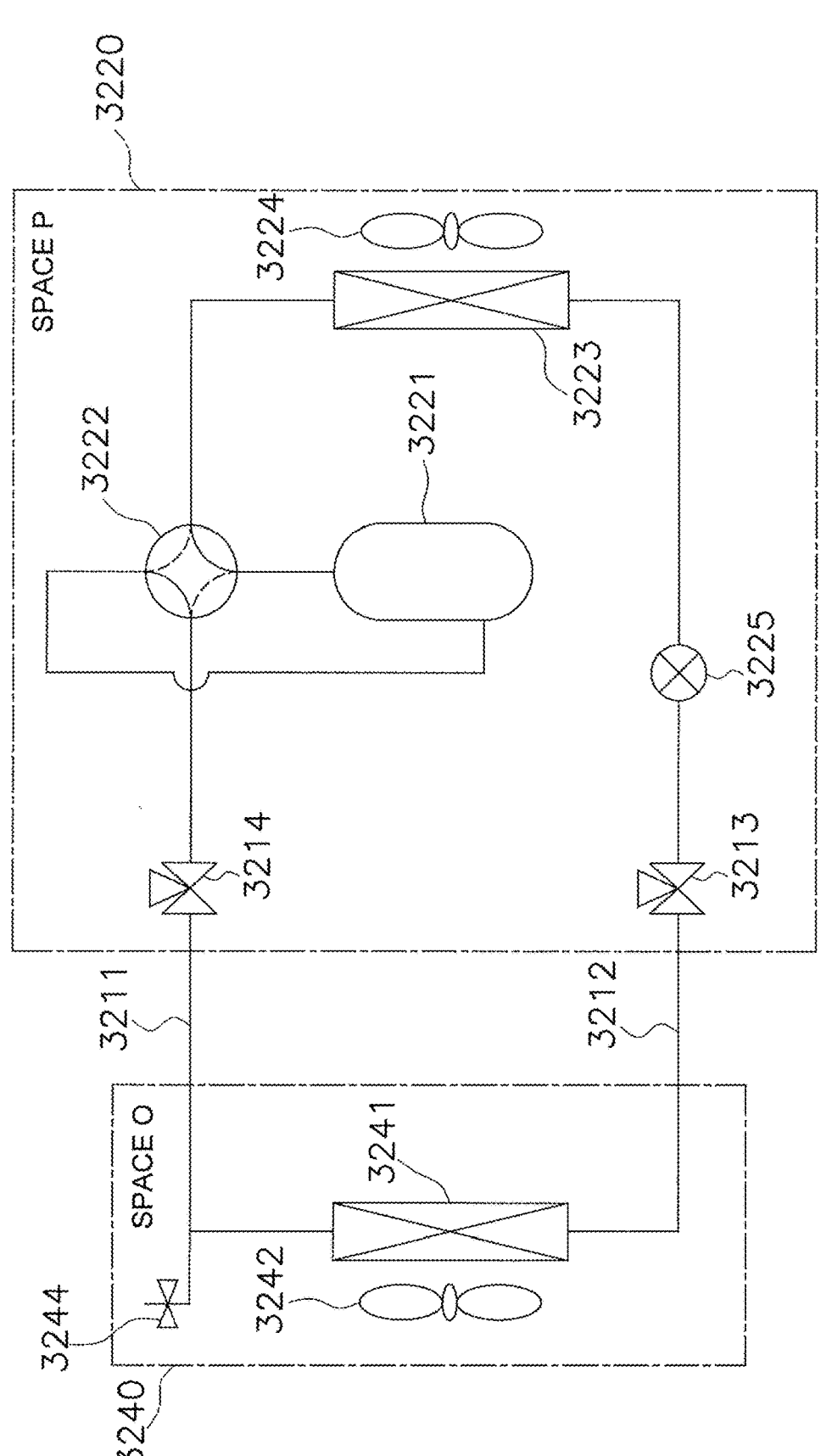

FIG. 21 is a schematic diagram illustrating the configuration of a refrigerant cycle used in Application Example 3.

Figure 22:
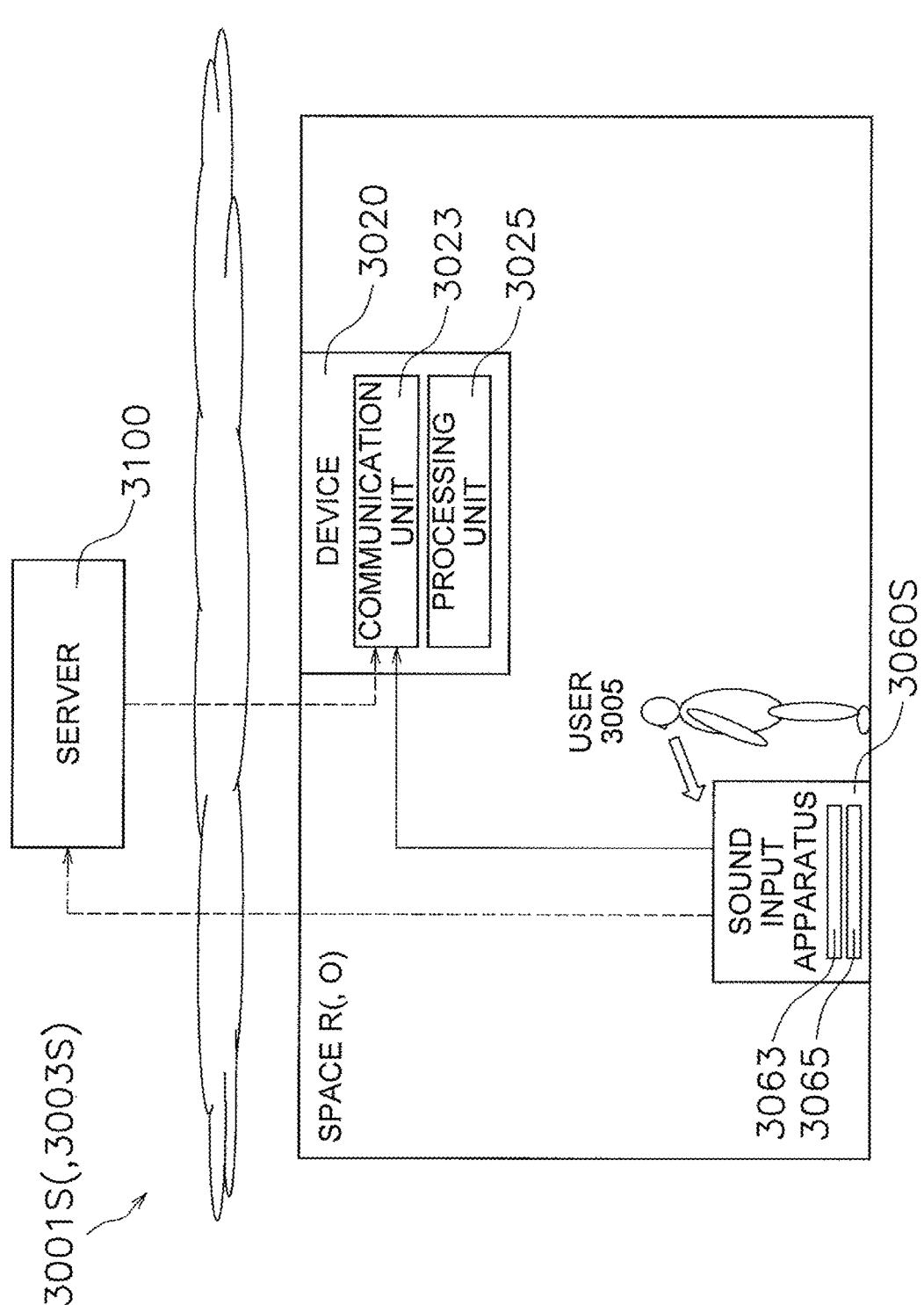

FIG. 22 is a schematic diagram illustrating the configuration of a device control system 3001S and an abnormality processing system 3003S according to a second embodiment of the third configuration.

Figure 23:
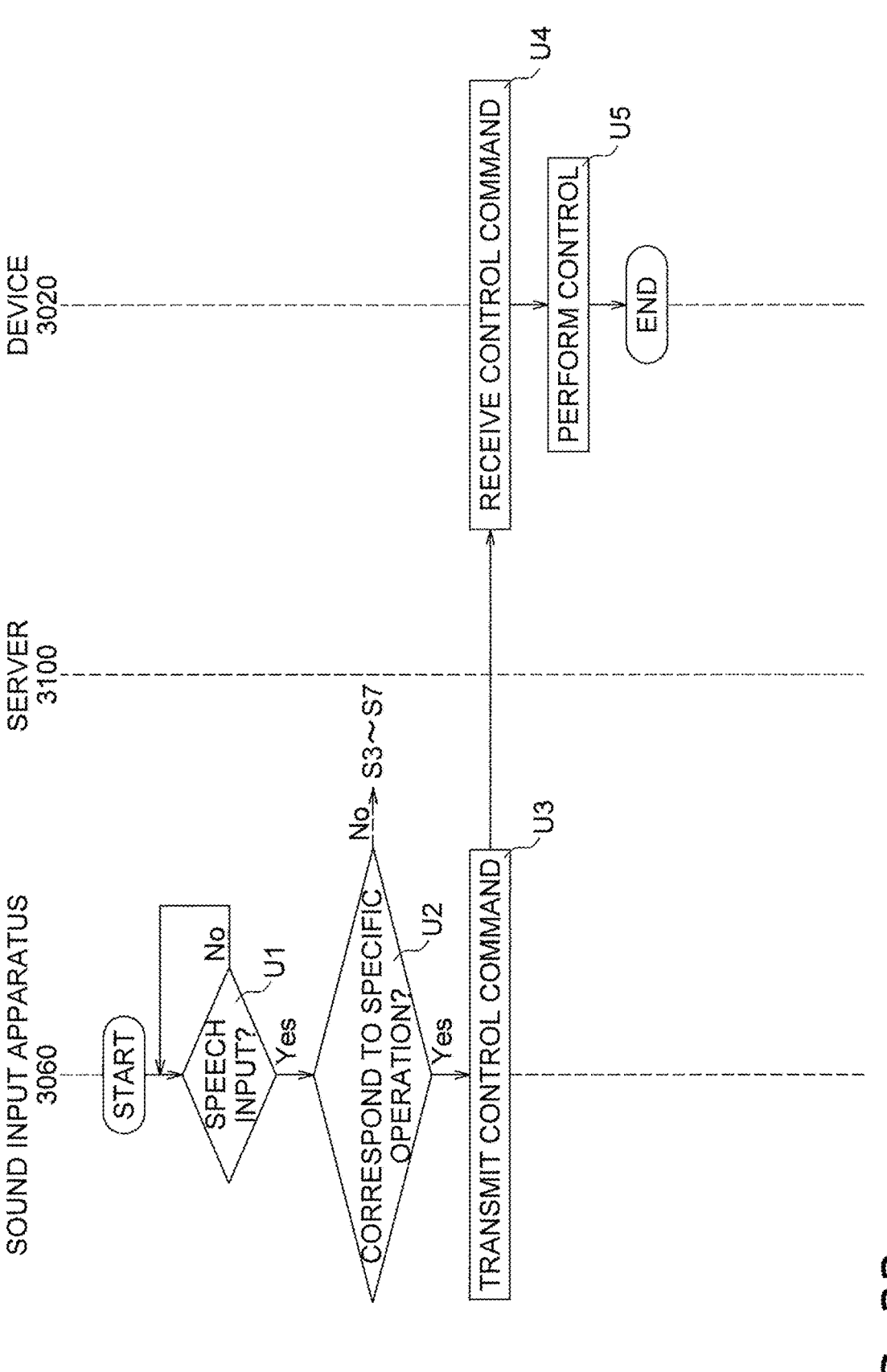

FIG. 23 is a sequence diagram illustrating operations of the device control system 3001S according to the same embodiment.

Figure 24:
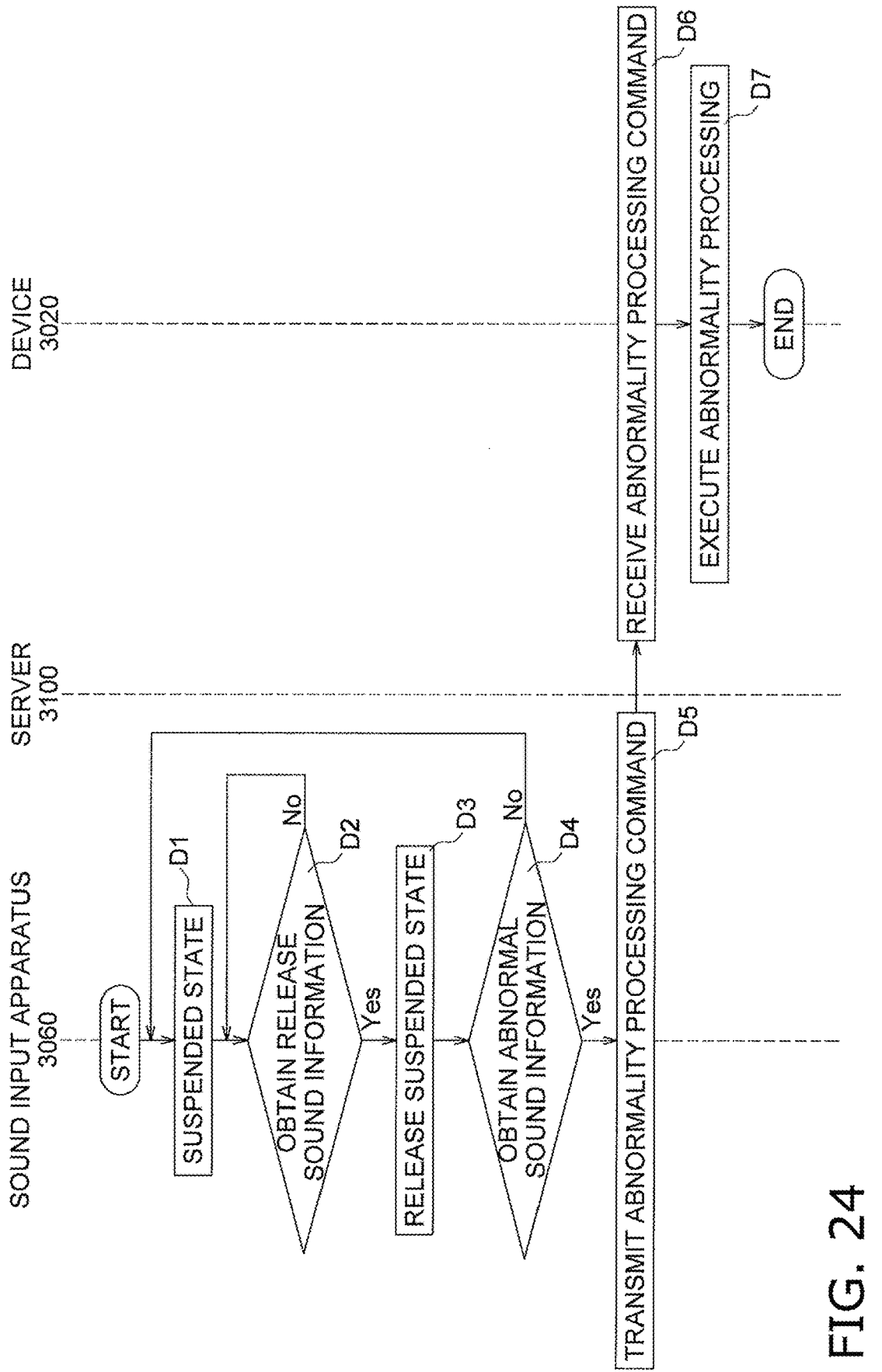

FIG. 24 is a sequence diagram illustrating operations of the abnormality processing system 3003S according to the same embodiment.

DESCRIPTION OF EMBODIMENTS

[First Configuration]

Now, a device control system according to a first configuration will be described with reference to drawings.

First Embodiment (1) Overall Configuration

Figure 1:
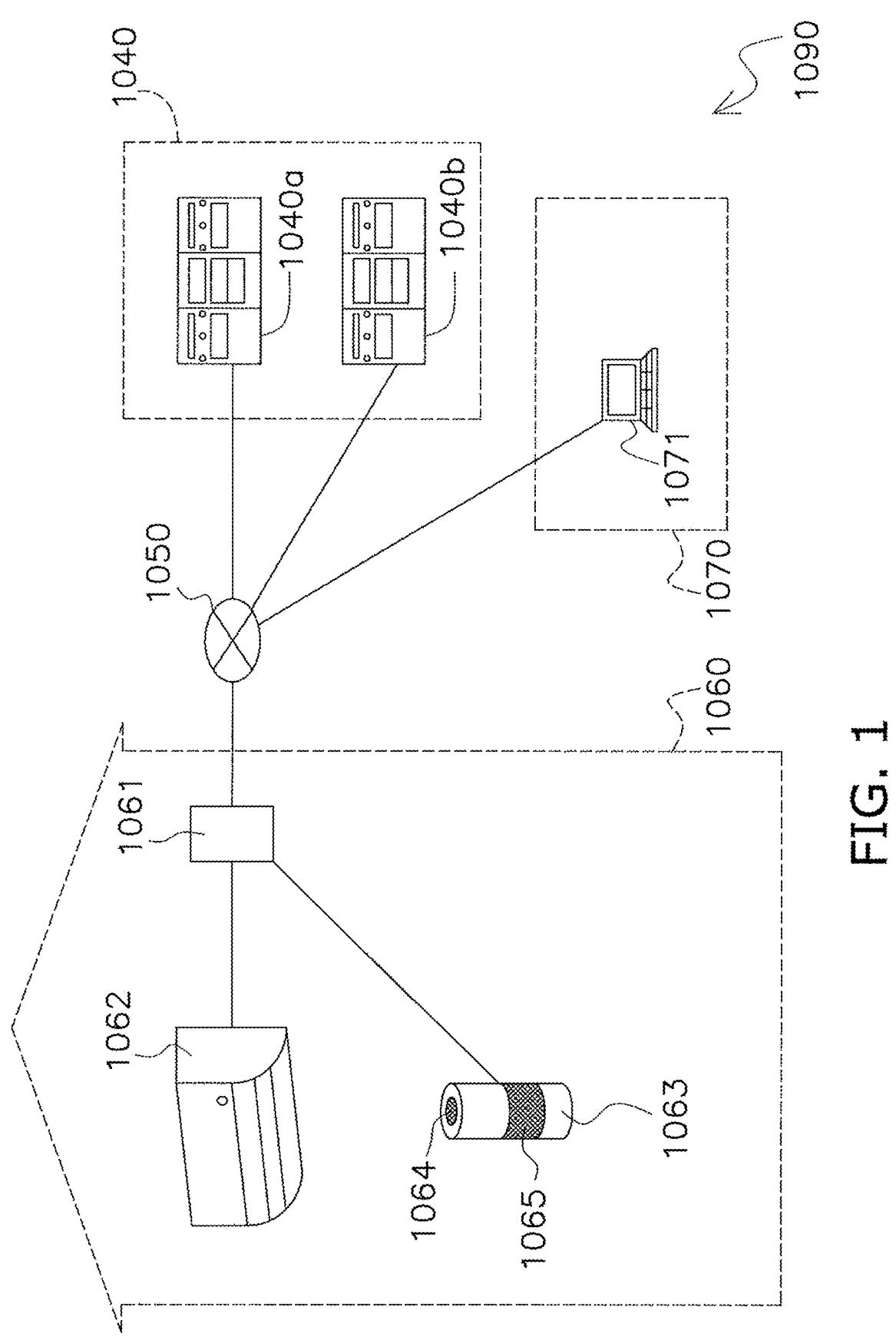
FIG. 1 is a schematic diagram of a management system 90 according to a first embodiment of a first configuration.

FIG. 1 illustrates a device control system according to a first embodiment of the present invention. The device control system is configured as a management system 1090 for an air conditioner or the like. The management system 1090 includes a server 1040, a router 1061, an air conditioner 1062, a sound input/output apparatus 1063, and a service center terminal 1071. The router 1061, the air conditioner 1062, and the sound input/output apparatus 1063 are provided in a building 1060, and the service center terminal 1071 is provided in a service center 1070. The server 1040, the air conditioner 1062, the sound input/output apparatus 1063, and the service center terminal 1071 are connected via a network 1050.

(1-1) Air Conditioner 1062

The air conditioner 1062 is connected to the network 1050 via the router 1061 having a switching hub. The link between the router 1061 and the air conditioner 1062 may be realized by any of wired communication and wireless communication.

(1-2) Sound Input/Output Apparatus 1063

The sound input/output apparatus 1063 is provided in a room where the air conditioner 1062 is provided. The sound input/output apparatus 1063 is connected to the network 1050 via the router 1061. The sound input/output apparatus 1063 includes a sound input unit 1064 and a sound output unit 1065. The link between the router 1061 and the sound input/output apparatus 1063 may be realized by any of wired communication and wireless communication.

(1-3) Network 1050

The network 1050 is, for example, the Internet established by using a Public Switched Telephone Network (PSTN) or the like.

(1-4) Server 1040

The server 1040 is provided at a location distant from the building 1060 and is connected to the network 1050. The server 1040 controls various devices in response to a voice spoken by a user of the air conditioner 1062. In addition, the server 1040 detects an abnormality from an operation sound of the air conditioner 1062 and performs other processing. The server 1040 may be configured as a single computer or may be configured from a plurality of computers 1040a and

1040b having functions different from each other. For example, a computer 1040a may analyze sounds and executes commands whereas another computer 1040b may accumulate operation sounds and detect abnormalities. In this case, the plurality of computers 1040a and 1040b may be provided at positions distant from each other and owned or managed by different companies.

(1-5) Service Center Terminal 1071

The service center terminal 1071 is a terminal used by a serviceman in the service center 1070.

(2) Detailed Configuration

Figure 2:
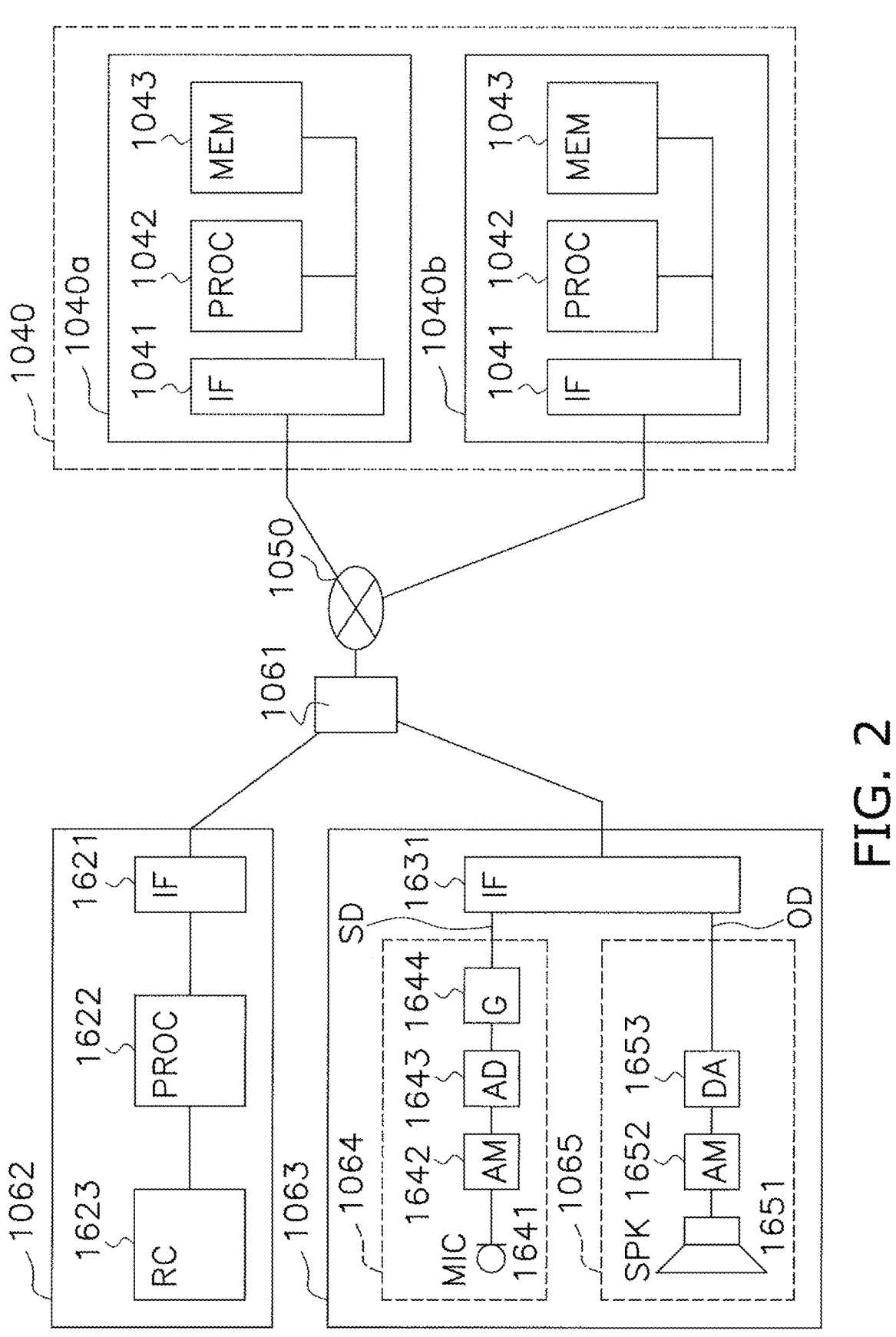
FIG. 2 is a block diagram of the configuration of the management system 90.

FIG. 2 is a block diagram of the configuration of the management system 1090.

(2-1) Air Conditioner 1062

The air conditioner 1062 includes an input/output interface unit 1621, a processor 1622, and a refrigerant circuit 1623. The input/output interface unit 1621 is connected to the network 1050 via the router 1061 and exchanges information with other devices. The refrigerant circuit 1623 includes a sensor and an actuator and conditions an air in a room. The processor 1622 controls the actuator of the air conditioner 1062, read an output from the sensor, and exchange information with the input/output interface unit 1621.

(2-2) Sound Input/Output Apparatus 1063

The sound input/output apparatus 1063 includes an input/output interface unit 1631, the sound input unit 1064, and the sound output unit 1065. The input/output interface unit 1621 is connected to the network 1050 via the router 1061 and exchanges information with other devices.

The sound input unit 1064 includes a microphone 1641, an amplifier 1642, an AD converter 1643, and a sound gate unit 1644. The microphone 1641 obtains an analog sound signal. The amplifier 1642 amplifies the obtained analog sound signal. The AD converter 1643 subjects the amplified analog sound signal to AD conversion to obtain sound data SD. The sound gate unit 1644 transmits or blocks the sound data SD in accordance with an external control signal or in accordance with a result of analysis of the sound data SD performed by the sound gate unit 1644. The sound data SD that has passed through the sound gate unit 1644 is transferred to the input/output interface unit 1631. If the sound gate unit 1644 detects that a human voice has spoken a predetermined keyword as the sound data SD, the sound gate unit 1644 may cause the sound data SD to pass over a predetermined period.

The sound output unit 1065 includes a DA converter 1653, an amplifier 1652, and a speaker 1651. The DA converter 1653 performs DA conversion of output data OD received from the input/output interface unit 1631 and transfers the obtained analog output signal to the amplifier 1652. The amplifier 1652 amplifies the analog output signal. The speaker 1651 outputs a sound corresponding to the amplified analog output signal.

(2-3) Server 1040

The server 40 includes the computers 1040a and 1040b. The number of computers included in the server 1040 may be any number. Only the configuration of the computer 1040a will be herein described. The computer 1040a includes an input/output interface unit 1041, a processor 1042, and a memory 1043. The input/output interface unit 1041 is connected to the network 1050. The processor 1042 performs various kinds of processing. The processing includes transmission/reception of information via the input/output interface unit 1041, various arithmetic operations, and the like. The memory 1043 stores information that is written by the processor 1042, for example.

(3) Functional Blocks

Figure 3:
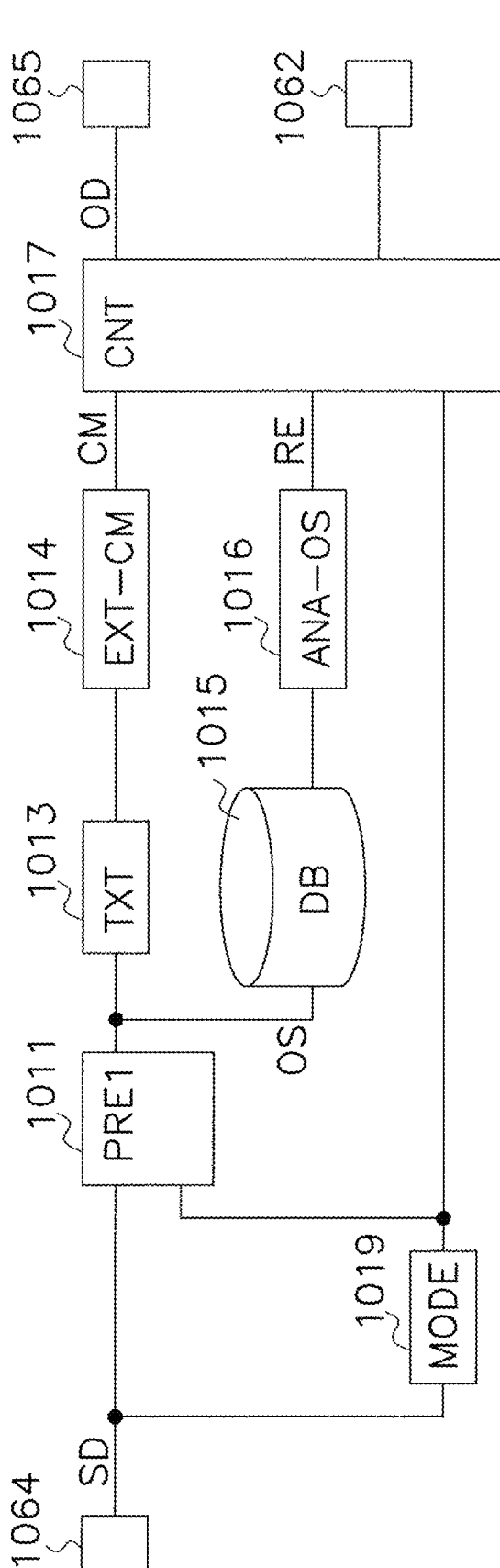
FIG. 3 is a block diagram regarding the functions of the management system 90.

FIG. 3 is a block diagram regarding the functions of the management system 1090. The management system 1090 includes, in addition to the sound input unit 1064 and the sound output unit 1065, a plurality of functional blocks, i.e., a first preprocessing unit 1011, a text conversion unit 1013, a command extracting unit 1014, an operation sound data accumulating unit 1015, an operation sound analyzing unit 1016, a control unit 1017, and a mode determining unit 1019. These functional blocks 1011 to 1019 may be configured as hardware such as an integrated circuit or a hard drive, or may alternatively be configured as software such as a program stored in the memories 1043 of the computers 1040a and 1040b of the server 1040 and executed by the processor 1042. The functional blocks 1011 to 1019 may be physically mounted in the computers 1040a or 1040b, the sound input/output apparatus 1063, the air conditioner 1062, or other positions.

In this embodiment, the first preprocessing unit 1011 is configured as hardware.

(4) Modes

The management system 1090 has two types of modes that are a command obtaining mode MC and an operation sound obtaining mode MO.

(4-1) Command Obtaining Mode MC

The command obtaining mode MC is a mode in which a command is obtained from a user's voice obtained by the sound input unit 1064 and the command is executed. Examples of the commands include operation start, operation stop, change of a set temperature, change of an operation mode (e.g., heating, cooling, dehumidification, or wind-blowing), and the like.

(4-2) Operation Sound Obtaining Mode MO

The operation sound obtaining mode MO is a mode in which an operation sound of the air conditioner 1062 is obtained by the sound input unit 1064 and is collated with operation sound data that has been accumulated so far, so as to obtain a result of determination as to whether an abnormality exists in the air conditioner 1062 or details of the abnormality.

(5) Operations (5-1) Mode Determination

In FIG. 3, the sound data SD is obtained by the sound input unit 1064. The sound data SD may be a user's voice or may be an operation sound of the air conditioner 1062. The mode determining unit 1019 determines whether the sound data SD is to be subjected to processing regarding the command obtaining mode MC or processing regarding the operation sound obtaining mode MO. Any of the following various methods can be employed for determining the mode.

(5-1-1) Sound Data SD

For example, the mode can be determined on the basis of features of the sound data SD. In this case, if the sound data SD contains a large number of features of a human voice, the mode transitions to the command obtaining mode MC. If content of the sound data SD contains a large number of features of the operation sound of the air conditioner 1062, the mode transitions to the operation sound obtaining mode MO.

(5-1-2) Keyword

If the sound gate unit 1644 recognizes a predetermined keyword spoken by a human voice as the sound data SD, the sound gate unit 1644 allows the sound data SD to pass therethrough. In this case, the command obtaining mode MC may be executed for a predetermined period, and then, the operation sound obtaining mode MO may be executed for a predetermined period. Once a series of operations ends, the sound gate unit 1644 may block the sound data SD.

(5-1-3) End of Command

If the command extracting unit 1014 detects an end of a speech command during the command obtaining mode MC, the mode determining unit 19 may determine that the command obtaining mode MC is to be changed to the operation sound obtaining mode MO.

(5-1-4) Operation Sound Obtaining Command

An operation sound obtaining command such as "operation sound accumulation" or "operation sound analysis" may be set in a group of commands that are acceptable by the management system 1090. If the command extracting unit 1014 detects any of these commands during the command obtaining mode MC, the mode determining unit 19 determines that the command obtaining mode MC is to be changed to the operation sound obtaining mode MO.

(5-1-5) Regular Obtaining

The mode determination may be performed on the basis of an elapsed time. That is, operations during the operation sound obtaining mode MO may be performed each time a fixed period elapses. The fixed period may be, for example, an hour, a week, a month, or a year. This operation is performed as a regular diagnosis of the air conditioner 62.

(5-2) Operations During Command Obtaining Mode MC

During the command obtaining mode MC, the sound data SD is a user's voice. The sound data SD obtained by the sound input unit 1064 is subjected to first preprocessing by the first preprocessing unit 1011 configured as hardware. This first preprocessing includes filtering processing for extracting a component related to the frequency band of a human voice from the sound data SD. An output from the first preprocessing unit 1011 is transferred to the text conversion unit 1013. Considering features of a language that is expected to be used by the user, the text conversion unit 1013 converts the sound data that has been subjected to the first preprocessing into text. An output from the text conversion unit 1013 is transferred to the command extracting unit 1014. The command extracting unit 1014 analyzes the syntax of the text and extracts a command CM that is to be transmitted to the air conditioner 1062. The obtained command CM is transmitted to the air conditioner 1062 by the control unit 1017.

(5-3) Operations During Operation Sound Obtaining Mode MO

During the operation sound obtaining mode MO, the sound data SD is an operation sound of the air conditioner 1062. During the operation sound obtaining mode MO, the functions of the first preprocessing unit 1011 configured as hardware are inactivated, and the first preprocessing unit 1011 allows the sound data SD obtained by the sound input unit 1064 to pass therethrough directly. The sound data SD is not subjected to the first preprocessing by the first preprocessing unit 1011 and is accumulated in the operation sound data accumulating unit 1015 as operation sound data OS. The operation sound analyzing unit 1016 collates the most recent operation sound data OS with previously accumulated operation sound data OS to determine whether an abnormality exists in the air conditioner 1062 and the type of the abnormality. A determination result RE obtained by the operation sound analyzing unit 1016 is transferred to the control unit 1017. In accordance with the determination result RE, the control unit 1017 performs any of the following operations, for example.

If the determination result RE is normal, control the air conditioner 1062.

If the determination result RE is abnormal, control the air conditioner 1062 in a manner different from that performed in normal times.

If the determination result RE is abnormal, notify the user of details of the abnormality through the sound output unit 1065.

If the determination result RE is abnormal, output a message for notifying the user of countermeasures against the abnormality through the sound output unit 1065. (Examples of details of the message include recommendation of cleaning an air filter of the air conditioner 1062, recommendation of removing a foreign matter by cleaning a friction part of a flap for adjusting an air blowing direction, recommendation of calling a serviceman, and the like.)

If the determination result RE is abnormal, transmit details of the abnormality to the service center terminal 1071.

(5-4) Analysis Method of Operation Sound Analyzing Unit 1016

Figure 4:
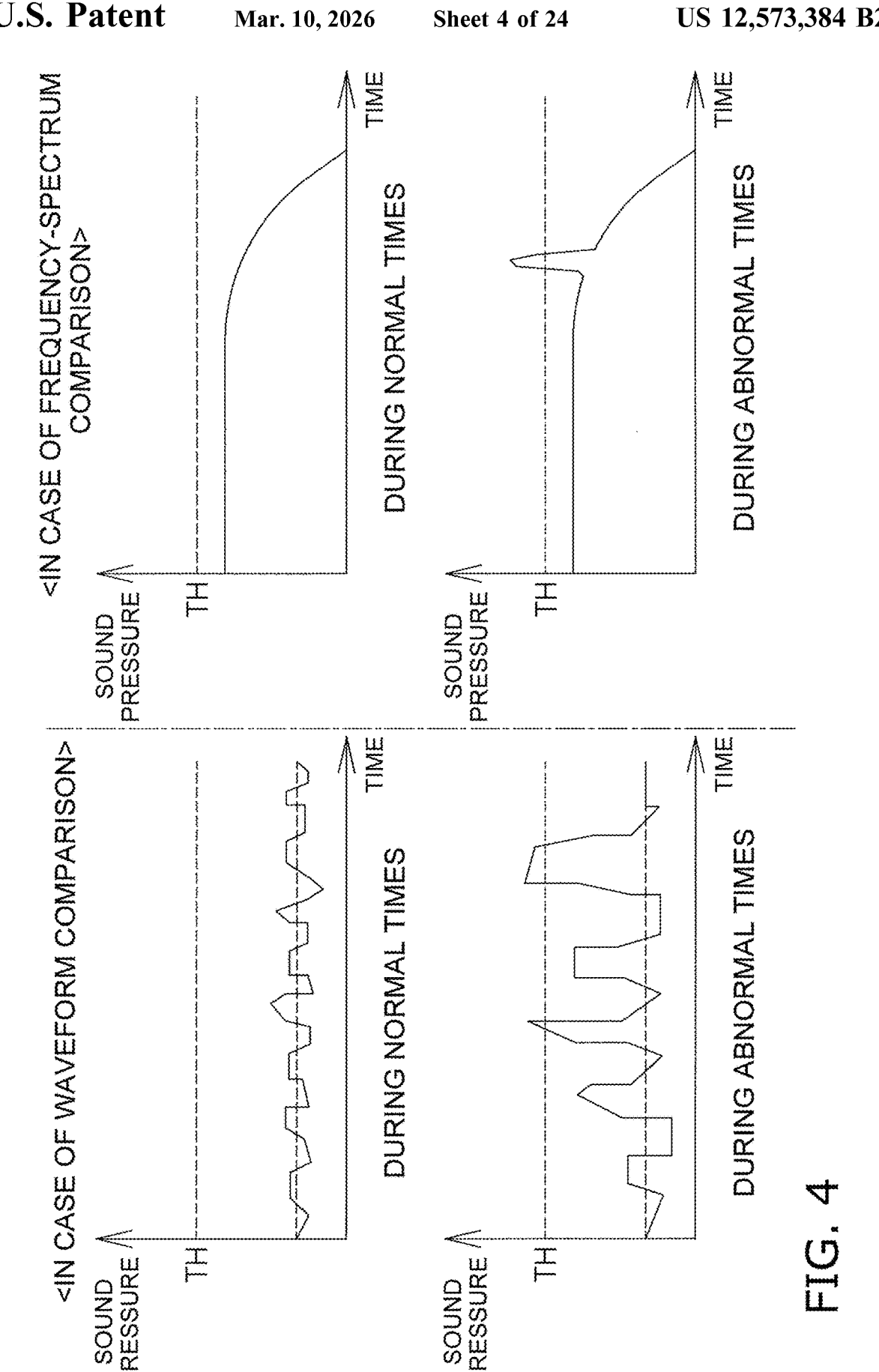
FIG. 4 is a graph illustrating a method for detecting an abnormality based on a waveform or frequency spectrum of an operation sound.

Various methods can be employed as an analysis method of the operation sound analyzing unit 1016. For example, as illustrated in FIG. 4, an abnormality may be detected by determining how much the current operation sound deviates from a waveform or frequency spectrum of the operation sound in a case where the air conditioner 1062 operates normally. For the abnormality determination, for example, comparison with a threshold TH may be employed.

Alternatively, a learned model may be created through machine learning on the basis of the accumulated operation sound data OS and corresponding information regarding whether an abnormality exists or its details, and the learned model may be used as an artificial intelligence of the operation sound analyzing unit 1016.

Alternatively, an expert system reflecting the techniques of an expert serviceman may be established, and an artificial intelligence using the expert system may be used as the operation sound analyzing unit 1016.

One of a plurality of analysis methods may be selected in accordance with the situation. For example, the analysis method may be determined on the basis of at least one of parameters including details of a user's command, the number of years the air conditioner 1062 has been used, the model of the air conditioner 1062, and the like.

(6) Features (6-1)

The sound data SD received by the command extracting unit 1014 is subjected to the first preprocessing, while the sound data transferred to the operation sound analyzing unit 1016 is not subjected to the first preprocessing. Thus, since the sound data SD having different characteristics from those of the sound data SD for the command extracting unit 1014 can be transferred to the operation sound analyzing unit 1016, the management system 1090 is suitable for analyzing the operation sound for abnormality detection.

(6-2)

The sound data SD transferred to the operation sound analyzing unit 1016 is not subjected to the first preprocessing for extracting the component related to the frequency band of the human voice. Thus, the operation sound analyzing unit can receive the sound data SD that is more suitable for analysis.

(6-3)

The accumulated operation sound data OS is analyzed so as to determine whether an abnormality exists in the current operation sound or its details. Thus, the accuracy of abnormality detection is further improved.

(6-4)

Functional blocks including the command extracting unit 1014 cannot perform a meaningful operation until a keyword is spoken. Thus, since it is possible to make at least a part of the functional blocks remain in a sleep state before a keyword is spoken, the consumption of a processing capability is suppressed.

(6-5)

From among a plurality of analysis methods, an optimal analysis method is selected on the basis of the command, the number of years, the model, and the like. Thus, the accuracy of abnormality detection is further improved.

(6-6)

The management system 1090 has two modes, which are the command obtaining mode MC and the operation sound obtaining mode MO. Thus, as long as no command is obtained, various kinds of operation sound data OS can be accumulated.

(6-7)

The operation sound data OS is accumulated in accordance with the user's or serviceman's intention. Thus, the user or serviceman can supplement the operation sound data OS or check the operation of the management system 1090.

(6-8)

According to the regular obtaining, the operation sound data OS is accumulated on a regular basis. Thus, since various kinds of information that can be used for analysis are obtained, the accuracy of abnormality detection is improved.

(6-9)

In a case where an abnormality occurs in the air conditioner 1062, the user can hear countermeasures from the sound output unit 1065. Thus, the usability of the air conditioner is improved.

(6-10)

With this configuration, the service center terminal 1071 can receive the determination result RE. Thus, since the serviceman can understand that an abnormality occurs in the air conditioner 1062, maintenance can be carried out immediately.

(7) Modifications (7-1)

Figure 5:
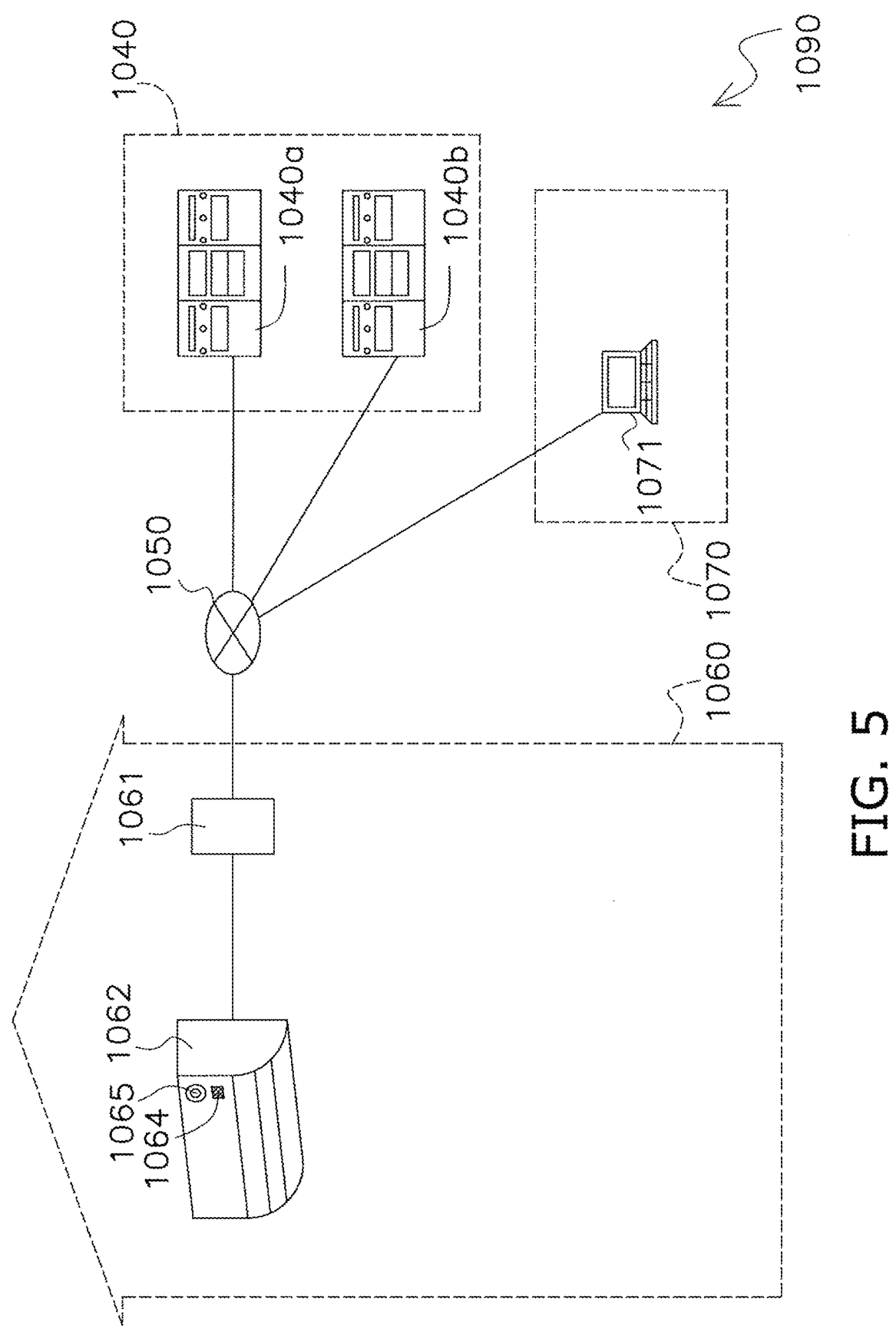
FIG. 5 is a schematic diagram of the management system 90 according to a first modification of the first embodiment of the first configuration.

The above embodiment employs the sound input/output apparatus 1063, which is separated from the air conditioner 1062. Instead, as illustrated in FIG. 5, the sound input unit 1064 and the sound output unit 1065 may be incorporated in the air conditioner 1062.

With this configuration, the space for installing the management system 1090 in the building 1060 can be downsized.

(7-2)

Figure 6:
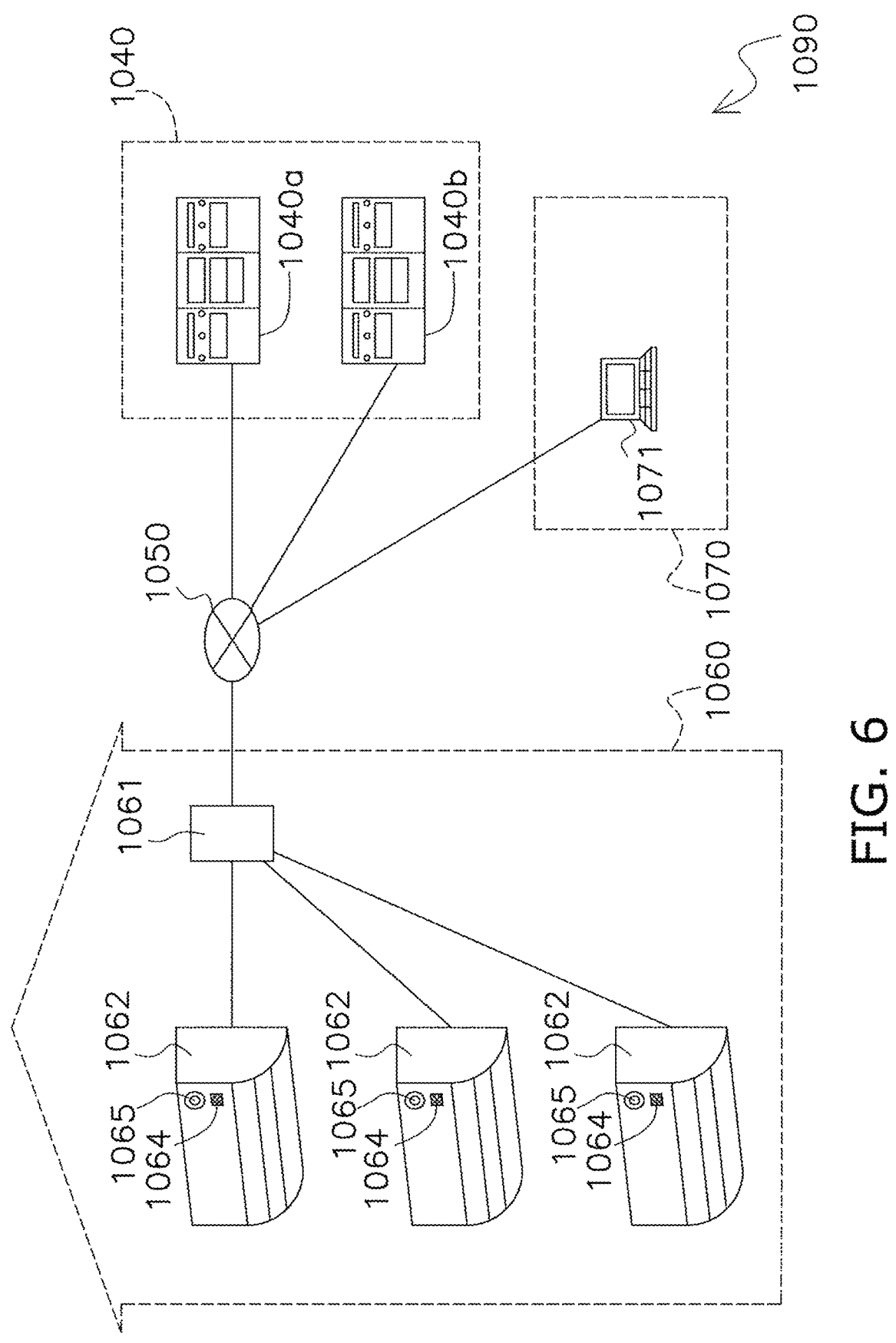

In the above embodiment, the single air conditioner 1062 is included in the management system 1090. Instead, as illustrated in FIG. 6, a plurality of air conditioners 1062 may be included in the management system 1090. Each of the plurality of air conditioners 1062 has a different identification number. A piece of operation sound data OS is stored in association with the identification number corresponding to the piece of operation sound data OS.

With this configuration, the operation sound data OS of the plurality of air conditioners 1062 is accumulated. Thus, an abnormality in the plurality of air conditioners 1062 is likely to be found.

(7-3)

An output regarding whether an abnormality exists or details of the abnormality may not be only performed by audio output from the sound output unit 1065, but also may be performed by a display panel or LEDs.

With this configuration, the user can visually obtain information about an abnormality.

Second Embodiment (1) Configuration

Figure 7:
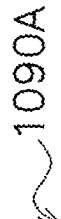
FIG. 7 is a block diagram regarding the functions of a management system 90A according to a second embodiment of the first configuration.
Figure 7:
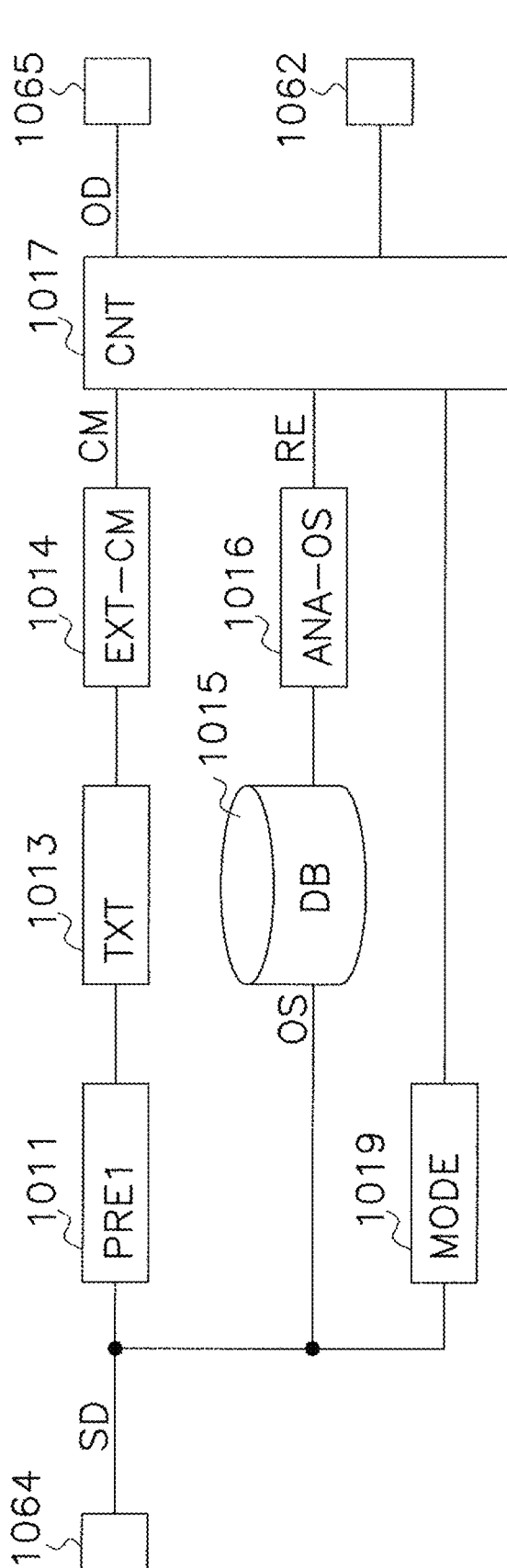

FIG. 7 is a block diagram regarding the functions of a management system 1090A according to a second embodiment of the present invention. In the second embodiment, the first preprocessing unit 1011 is configured as software. During the command obtaining mode MC, the sound data SD is subjected to the first preprocessing by the first preprocessing unit 1011, and the sound data subjected to the first preprocessing is transferred to the text conversion unit 1013. On the other hand, during the operation sound obtaining mode MO, the sound data SD is not subjected to the first preprocessing and is directly transferred to the operation sound data accumulating unit 1015 as the operation sound data OS.

(2) Features

With this configuration, the first preprocessing unit 1011 is configured by the processors 1042 of the computers 1040a and 1040b. Thus, it is unnecessary to prepare dedicated hardware for the first preprocessing unit 1011.

(3) Modifications

The modifications in the first embodiment are also applicable to this embodiment.

Third Embodiment (1) Configuration

Figure 8:
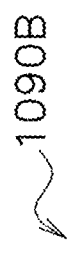
FIG. 8 is a block diagram regarding the functions of a management system 90B according to a third embodiment of the first configuration.

FIG. 8 is a block diagram regarding the functions of a management system 1090B according to a third embodiment of the present invention. This embodiment is different from the first embodiment in, for example, that a second preprocessing unit 1012 is provided and that information other than the operation sound data OS is further recorded in the operation sound data accumulating unit 1015.

The second preprocessing unit 1012 performs second preprocessing on the sound data SD. The second preprocessing includes filtering processing for removing a component related to the frequency band of a human voice from the sound data SD. Each of the first preprocessing unit 1011 and the second preprocessing unit 1012 may be configured as hardware or may be configured as software.

The operation sound data accumulating unit 1015 accumulates the operation sound data OS in association with operation information OI or details of a command CM. The operation information OI is information indicating an operation state of the air conditioner 1062 and is, for example, the operation mode of the air conditioner 1062, operation content of an actuator mounted in the air conditioner 1062, data obtained from a sensor mounted in the air conditioner 1062, or the like. The command CM is extracted by the command extracting unit 1014 and relates to an operation that is intended by a user to be performed by the air conditioner 1062.

(2) Features (2-1)

The sound data OS accumulated in the operation sound data accumulating unit 1015 is subjected to the second preprocessing for removing the component related to the frequency band of the human voice. Thus, since the sound data from which noise other than the operation sound of the air conditioner 1062 is removed is analyzed, the accuracy of abnormality detection is improved.

(2-2)

The operation sound data OS and the command CM are associated with each other. Thus, since the relationship between the operation that is intended by the user to be performed by the air conditioner 1062 and the operation sound can be leaned, the accuracy of abnormality detection is further improved.

(2-3)

The operation sound data OS and the operation information OI are associated with each other. Thus, since the relationship between the state of the air conditioner 1062 and the operation sound can be leaned, the accuracy of abnormality detection is further improved.

(3) Modifications

The modifications in the first embodiment are also applicable to this embodiment.

Others

The embodiments of the present invention have been described above. However, it should be understood that various modifications can be made on the form or details without departing from the spirit and scope of the present invention described in the claims.

[Second Configuration]

Now, a device control system 2001 according to a second configuration will be described with reference to drawings. The device control system 2001 includes an information providing system. The following embodiment is a specific example of the present invention and is not to limit the technical scope of the present invention. The following embodiment can be modified as appropriate without departing from the spirit of the present invention.

(1) Outline of Device Control System Including Information Providing System

FIG. 9 schematically illustrates the configuration of the device control system 2001 including the information providing system. FIG. 10 is a schematic block diagram of the device control system 2001. Note that some components of the device control system 2001 are omitted from the illustration in FIG. 10.

A basic function of the device control system 2001 is to control an air conditioner 2010 installed in a room R for rent in accordance with a speech command of a resident, who is a renter of the room R. In addition, the device control system 2001 also includes a function for controlling devices 2050*a*, 2050*b*, . . . 2050*n* included in a first device group 2050 and devices 2060*a*, 2060*b*, . . . 2060*m* included in a second device group 2060, which will be described later, in accordance with the resident's speech command.

Furthermore, the device control system 2001 also includes a function of the information providing system that provides evaluation information regarding noise of the renter to the renter of the room R and an owner of the room R for rent. The device control system 2001 as the information providing system generates the renter's noise evaluation by using data of sounds collected by microphones 2140 incorporated in the air conditioner 2010, which will be described later.

The device control system 2001 mainly includes the air conditioner 2010, the first device group 2050, the second device group 2060, an infrared transmitter 2040, an analysis server 2020, an air-conditioner server 2030, a device server 2070, and a noise evaluation server 2200 (see FIG. 9).

The air conditioner 2010, the first device group 2050, the second device group 2060, and the infrared transmitter 2040 are provided in the room R (see FIG. 9). The room R herein is one of rooms of collective housing (apartment or condominium) including a plurality of rooms each of which is of a one-room type. In each room R, an owner of the room R provides home appliances, furniture, and the like in advance. The room R includes the single air conditioner 2010. The room R also includes the devices 2050*a*, 2050*b*, 2050*n*, such as audio equipment, a microwave, a ventilation fan, and a desk lamp, and the devices 2060*a*, 2060*b*, . . . 2060*m*, such as a television, a washing machine, a refrigerator, an electric hot water supply apparatus, and a ceiling light.

Typically, the analysis server 2020, the air-conditioner server 2030, the device server 2070, and the noise evaluation server 2200 are provided in a position different from that of the room R (distant position outside the room R).

Note that the numbers of the air conditioner 2010, the devices 2050*a*, 2050*b*, 2050*n* in the first device group 2050, the devices 2060*a*, 2060*b*, . . . 2060*m* in the second device group 2060, and the infrared transmitter 2040 provided in the room R are not limited to the numbers illustrated in FIG. 9 and may be one or more.

The air conditioner 2010, the first device group 2050, the second device group 2060, the infrared transmitter 2040, the analysis server 2020, the air-conditioner server 2030, the device server 2070, and the noise evaluation server 2200 will be further described below.

(2) Air Conditioner

The air conditioner 2010 mainly includes an indoor unit 2012, an outdoor unit 2014, a refrigerant connection pipe that connects the indoor unit 2012 and the outdoor unit 2014, a communication unit 2016, a controller 2018, and the microphones 2140 (see FIG. 9 and FIG. 10). The air conditioner 2010 is an apparatus that conditions air in an inside space of the room R.

(2-1) Microphones

The air conditioner 2010 can be operated by receiving a command speech at the microphones 2140 (see FIG. 10). The command speech is, for example, a speech such as "turn on the air conditioner", "set the set temperature at 25° C.", or the like. Note that the air conditioner 2010 according to this embodiment is configured to be able to be operated by, in addition to the speech operation, a typical remote controller.

In the device control system 2001, the microphones 2140 are configured to be able to also accept a command speech for the devices 2050*a*, 2050*b*, . . . 2050*n* in the first device group 2050 and the devices 2060*a*, 2060*b*, . . . 2060*m* in the second device group 2060. In addition, the microphones 140 collect a voice spoken by a person in the room R and operation sounds produced by the devices 2050*a*, 2050*b*, . . . 2050*n* and 2060*a*, 2060*b*, 2060*m*.

In this manner, each of the microphones 2140 serves as a measurement unit that measures a sound in the room R.

(2-2) Refrigerant Circuit and Controller

In the air conditioner 2010, the indoor unit 2012 and the outdoor unit 2014 are connected via the refrigerant connection pipe, and thereby an indoor heat exchanger (omitted from illustration) of the indoor unit 2012, and a compressor, an outdoor heat exchanger, an expansion valve, and the like (omitted from illustration) of the outdoor unit 2014 are connected via pipes, and a refrigerant circuit is formed. In the air conditioner 2010, a refrigerant circulates in the refrigerant circuit so as to cool/heat the space in the room R where the indoor unit 2012 is provided.

Operations of the air conditioner 2010 are controlled by the controller 2018. The controller 2018 includes, for example, a control board 2018*a* included in the indoor unit 2012 and a control board (not illustrated) included in the outdoor unit 2014. Note that the control board 2018*a* of the indoor unit 2012 mainly controls operations of components of the indoor unit 2012, and the control board of the outdoor unit 2014 mainly controls operations of components of the outdoor unit 2014. A central processing unit (CPU) of each of the control boards of the indoor unit 2012 and the outdoor unit 2014 included in the controller 2018 executes a program for air-conditioning control so as to control operations of the units of the air conditioner 2010 in accordance with a command C, which will be described later, transmitted from the air-conditioner server 2030, for example.

(2-3) Sound Processing Chip

The indoor unit 2012 includes a sound processing chip 2170 as another electronic component of the control board 2018*a*. The sound processing chip 2170 is preferably integrated with the control board 2018*a*. That is, the indoor unit 2012 preferably includes a module 2180 into which the control board 2018*a* and the sound processing chip 2170 are integrated (see FIG. 10).

(2-3-1) Function of Sound Processing Chip for Recognizing Command Speech

The sound processing chip 2170 is an integrated circuit that processes command speeches obtained by the microphones 2140 to generate a signal S to be described later. In addition, the sound processing chip 2170 is an integrated circuit that recognizes, from among the command speeches obtained by the microphones 2140, only a specific command speech (performs speech recognition processing on the command speeches and recognizes only the specific command speech) to generate a predetermined command C0.

The specific command speech is, for example, a speech for requesting the air conditioner 2010 to be ready for an input of the next command speech. The predetermined command C0 includes, for example, a command for requesting the microphones 2140 to accept the subsequent command speech. In addition, the predetermined command C0 includes, for example, a command for requesting a transmission unit 2016*a*, which will be described later, of the communication unit 2016 to be ready for transmitting a signal S based on a command speech (that is to be accepted subsequently to the specific command speech) other than the specific command speech among the command speeches accepted by the microphones 2140.

Note that the specific command speech is not necessarily a speech for requesting the air conditioner 2010 to be ready for an input of the next command speech. For example, the specific command speech may be a speech for requesting execution of a basic operation (e.g., turning on/off) of the air conditioner 2010, and the predetermined command C0 generated in response to this may be a command for requesting the controller 2018 to start/stop the air conditioner 2010. Furthermore, a signal S based on a command speech for requesting execution of an operation of the air conditioner 2010 other than the basic operation may be transmitted to an external apparatus (the analysis server 2020).

(2-3-2) Function of Sound Processing Chip for Determining Noise

In addition, if a sound higher than or equal to a fixed sound level (predetermined level), such as 50 db, enters the microphones 2140, the sound processing chip 2170 analyzes data of the sound. On the basis of the frequency or the like of the sound, it is determined whether the sound is a human voice or other sounds. The other sounds may be audio from a television, a sound of a washing machine, a sound of an electric hot water supply apparatus, a music produced by audio equipment, a sound of a ventilation fan, a sound of stepping or hitting a wall of the resident of the room R, and the like. A detailed analysis of data of a sound other than a human voice is performed by the noise evaluation server 2200, which will be described later, instead of the sound processing chip 2170.

FIG. 11 illustrates a flow of a noise determining process performed by the sound processing chip 2170 of the air conditioner 2010.

The sound processing chip 2170 constantly monitors the level of sounds that are input to the microphones 2140 and determines whether the level of collecting sounds exceeds the predetermined level (step S11).

If it is determined in step S11 that the sound level exceeds the predetermined level, the sound processing chip 2170 determines whether the sound is a human voice (step S12). This determination is made on the basis of frequency analysis of the sound, for example.

If it is determined in step S12 that the sound exceeding the predetermined level is a human voice, the process proceeds to step S13, and the sound processing chip 2170 starts to store information such as the sound level, time, and duration in a memory. The information of the sound level and time is stored in the memory until the human voice with the volume exceeding the predetermined level keeps falling below the predetermined level continuously for a fixed period (step S14).

On the other hand, if it is determined in step S12 that the sound exceeding the predetermined level is not a human voice, the process proceeds to step S16, and the sound processing chip 2170 starts to store the sound level, time, duration, and a frequency analysis result in the memory. This is continued until the sound level continuously falls below the predetermined level (step S17).

Transmission of the data regarding the sound stored in the memory to an external apparatus, which is illustrated in step S15 and step S18 in FIG. 11, will be described later.

(2-4) Communication Unit

The air conditioner 2010 includes the communication unit 2016 for communicating with the analysis server 2020 and the air-conditioner server 2030 that are external apparatuses of the air conditioner 2010. The air conditioner 2010 (the communication unit 2016) is connected to the analysis server 2020 and the air-conditioner server 2030 via a network 2080 (see FIG. 9). The network 2080 is the Internet herein, but may be another WAN. The air conditioner 2010 is connected to a router 2082 via a wireless LAN and is connected to the network 2080 via the router 2082 (see FIG. 9). The router 2082 includes an interface for the WAN and an interface for the LAN so as to mutually connect the WAN and the LAN. Note that the air conditioner 2010 and the router 2082 may be connected via a wired LAN instead of a wireless LAN. In addition, the network 2080 may be a LAN.

The communication unit 2016 is a wireless LAN adaptor that performs wireless communication with the router 2082, for example. The communication unit 2016 includes the transmission unit 2016*a* that transmits information and a reception unit 2016*b* that receives information as functional units (see FIG. 10).

(2-4-1) External Transmission of Signal Based on Command Speech

The transmission unit 2016*a* externally transmits the signal S based on command speeches accepted by the microphones 2140 (see FIG. 10), for example. In particular, among the command speeches accepted by the microphones 2140, the transmission unit 2016*a* externally transmits the signal S based on a command speech other than the specific command speech. However, without limitation to this, the transmission unit 2016*a* may externally transmit the signal S based on all the command speeches accepted by the microphones 2140.

The signal S herein is a digital speech signal obtained by performing AD conversion on the command speech by the sound processing chip 2170. Note that the signal S may be, for example, data obtained by further compressing the digital speech signal by the sound processing chip 2170 by using any sound data compression format (e.g., MP3). In addition, the signal S may be text data obtained by the sound processing chip 2170 from the command speech (data obtained by converting the speech into text). The transmission unit 2016*a* preferably transmits the signal S to a plurality of addresses (e.g., the analysis server 2020 and the air-conditioner server 2030).

(2-4-2) External Transmission of State Quantity of Air Conditioner and the Like

In addition, the transmission unit 2016*a* preferably transmits information J regarding a state quantity related to at least one of the air conditioner 2010 and an air-conditioning target space to the air-conditioner server 2030 (see FIG. 10). The state quantity related to the air conditioner 2010 includes, for example, a temperature/pressure of the refrigerant measured by sensors (not illustrated) at various positions in the refrigerant circuit, the number of revolutions of an inverter control motor (not illustrated) of a compressor of the outdoor unit 2014, an opening degree of the expansion valve of the outdoor unit 2014, and the like. The state quantity related to the air-conditioning target space includes a temperature of the air-conditioning target space measured by a sensor (not illustrated) and the like.

The reception unit 2016*b* externally receives a command C in accordance with a signal S (in particular, a signal S based on a command speech regarding control of the air conditioner 2010) transmitted from the transmission unit 2016*a*, for example. More specifically, the reception unit 2016*b* receives a command C generated on the basis of an analysis result of a signal S (in particular, a signal S based on a command speech regarding control of the air conditioner 2010) by the analysis server 2020. Preferably, the reception unit 2016*b* receives a command C generated by the air-conditioner server 2030 on the basis of an analysis result of a signal S (in particular, a signal S based on a command speech regarding control of the air conditioner 2010) by the analysis server 2020 and the information J regarding the state quantity transmitted from the transmission unit 2016a to the air-conditioner server 2030.

The controller 2018 that controls operations of the air conditioner 2010 controls operations of the air conditioner 2010 on the basis of the command C. The command C relates to, for example, at least one of turning on/off of the operation of the air conditioner 2010, switching of an operation mode (e.g., cooling, heating, dehumidification, or ventilation) of the air conditioner 2010, change of the set temperature (target temperature of the air conditioning target space), a target number of revolutions of the inverter control motor (not illustrated) of the compressor of the outdoor unit 2014, a target opening degree of the expansion valve of the outdoor unit 2014, and a target rotational speed of a fan motor 2160 for inverter control of a fan 2150 of the indoor unit 2012.

(2-4-3) External Transmission of Data regarding Sound

In addition, the transmission unit 2016a transmits the above-described data in the memory regarding the sound exceeding the predetermined level, which is stored by the sound processing chip 2170, to the noise evaluation server 2200 via the air-conditioner server 2030 as noise data D (see FIG. 10).

In the above description of noise determination by the sound processing chip, the flow up to step S14 and step S17 in FIG. 11 has been described. Now, the subsequent steps will be described.

If it is determined in step S14 that the level of the human voice falls below the predetermined level continuously for a fixed period, the process proceeds to step S15. In step S15, the transmission unit 2016a transmits data of the sound level, time, and duration of the human voice, which have been stored, to the air-conditioner server 2030 as the noise data D. Upon reception of the noise data D, the air-conditioner server 2030 transmits it to the noise evaluation server 200.

If it is determined in step S17 that the level of the sound other than the human voice falls below the predetermined level continuously for a fixed period, the process proceeds to step S18. In step S18, the transmission unit 2016a transmits data of the sound level, time, duration, and frequency analysis result, which have been stored, to the air-conditioner server 2030 as the noise data D. Upon reception of the noise data D, the air-conditioner server 2030 transmits it to the noise evaluation server 2200.

(3) First Device Group

The devices 2050a, 2050b, . . . 2050n in the first device group 2050 can be operated by infrared signals. The devices 2050a, 2050b, . . . 2050n in the first device group 2050 are not connected to the network 2080.

The devices 2050a, 2050b, . . . 2050n in the first device group 2050 are operated by infrared signals transmitted from the infrared transmitter 2040 in accordance with command speeches that are input to the microphones 2140 of the air conditioner 2010. Examples of operations that can be performed by infrared signals include turning on/off of the devices 2050a, 2050b, . . . 2050n, change of brightness of a desk lamp, change of volume of audio equipment, and the like.

Note that the devices 2050a, 2050b, . . . 2050n in the first device group 2050 are configured to be able to be operated by using, in addition to speech operation (in addition to operations by infrared signals transmitted from the infrared transmitter 2040 in accordance with command speeches that are input), typical infrared remote controllers and switches provided for main bodies of the devices 2050a, 2050b, . . . 2050n.

(4) Second Device Group

The devices 2060a, 2060b, . . . 2060m in the second device group 2060 can be operated by signals transmitted via the network 2080. The devices 2060a, 2060b, . . . 2060m in the second device group 2060 include wireless LAN adaptors (nor illustrated) and are connected to the network 2080 via the router 2082 (see FIG. 9). The devices 2060a, 2060b, . . . 2060m in the second device group 2060 are connected to at least one of the analysis server 2020 and the device server 2070 via the network 2080 so that communication can be performed (see FIG. 9).

The devices 2060a, 2060b, . . . 2060m in the second device group 2060 are operated by signals transmitted from the analysis server 2020 or the device server 2070 in accordance with command speeches that are input to the microphones 2140 of the air conditioner 2010. Examples of operations that can be performed by signals transmitted from the analysis server 2020 or the device server 2070 include turning on/off of the devices 2060a, 2060b, . . . 2060m, change of channel or volume of a television, and the like.

Note that the devices 2060a, 2060b, . . . 2060m in the second device group 2060 are configured to be able to be operated by using, in addition to speech operation (in addition to operations by signals transmitted via the network 2080 in accordance with command speeches that are input), typically used remote controllers and switches provided for main bodies of the devices 2060a, 2060b, . . . 2060m.

(5) Analysis Server

The analysis server 2020 is connected to the air conditioner 2010 (the communication unit 2016) via the network 2080. Upon acceptance of command speeches by the microphones 2140 of the air conditioner 2010, as described above, the transmission unit 2016a of the air conditioner 2010 transmits a signal S based on the command speeches to the analysis server 2020 via the network 2080 (see FIG. 10). Note that the command speeches accepted by the microphones 2140 include a command speech related to control of the air conditioner 2010, command speeches related to control of the devices 2050a, 2050b, 2050n in the first device group 2050, and command speeches related to control of the devices 2060a, 2060b, . . . 2060m in the second device group 2060. In other words, the analysis server 2020 receives a signal S based on command speeches related to control of the air conditioner 2010, the devices 2050a, 2050b, . . . 2050n, and the devices 2060a, 2060b, 2060m.

In addition, the analysis server 2020 is connected to the air-conditioner server 2030 and the device server 2070 via the network 2080 so that communication can be performed.

The analysis server 2020 is a computer that executes a program stored in a storage apparatus (not illustrated) so as to analyze the received signal S. Specifically, for example, the analysis server 2020 performs speech recognition of the received speech signal.

Note that the storage apparatus of the analysis server 2020 stores, in addition to the program, a list of operable devices in each room R (the air conditioner 2010, the devices 2050a, 2050b, . . . 2050n in the first device group 2050, and the devices 2060*a*, 2060*b*, 2060*m* in the second device group 2060). That is, the analysis server 2020 obtains information about the operable devices directly or via the infrared transmitter 2040. In addition, for the devices 2060*a*, 2060*b*, . . . 2060*m* in the second device group 2060, information regarding whether the devices 2060*a*, 2060*b*, . . . 2060*m* to be controlled are targets to be directly controlled by the analysis server 2020 (targets to be controlled by either of the servers, the analysis server 2020 and the device server 2070).

The analysis server 2020 analyzes the speech as the signal S to obtain its feature amounts, and by using an acoustic model, a language model, and a speech recognition dictionary including a pronunciation dictionary stored in the storage apparatus, generates text information from the feature amounts. The text information generated by the analysis server 2020 is text information such as "turn on the air conditioner", "set the set temperature of the air conditioner at 25 degrees", "turn off the ceiling light", or "turn on the television", for example.

In a case where the text information relates to control of the air conditioner 2010 (e.g., in a case where the text information includes a keyword related to the air conditioner), the analysis server 2020 transmits the analysis result of the signal S (i.e., the generated text information) to the air-conditioner server 2030 via the network 2080 (see FIG. 10).

In a case where the text information relates to control of any of the devices 2050*a*, 2050*b*, . . . 2050*n* in the first device group 2050 (e.g., in a case where the text information includes a keyword related to the first device group 2050), the analysis server 2020 transmits a command for transmitting an infrared signal in accordance with the analysis result of the signal S (i.e., the generated text information) to the infrared transmitter 2040. For example, in a case where the text information is information related to a desk lamp included in the devices 2050*a*, 2050*b*, . . . 2050*n* in the first device group 2050 (e.g., "turn off the desk lamp"), the analysis server 2020 transmits a command for transmitting an infrared signal as a command for turning off the desk lamp to the infrared transmitter 2040. The command to the infrared transmitter 2040 is transmitted from the analysis server 2020 to the infrared transmitter 2040 via the network 2080. In this manner, the analysis server 2020 serves as a device operating unit.

In a case where the text information relates to control of any of the devices 2060*a*, 2060*b*, . . . 2060*m* in the second device group 2060 (e.g., in a case where the text information includes a keyword related to the second device group 2060), the analysis server 2020 transmits a command in accordance with the analysis result of the signal S (i.e., the generated text information) to the devices 2060*a*, 2060*b*, . . . 2060*m* in the second device group 2060. For example, in a case where the text information is information related to a television included in the devices 2060*a*, 2060*b*, . . . 2060*m* in the second device group 2060 (e.g., "turn up the volume of the television), the analysis server 2020 transmits a command for turning up the volume to the television. The command to the devices 2060*a*, 2060*b*, . . . 2060*m* in the second device group 2060 is transmitted from the analysis server 2020 to the devices 2060*a*, 2060*b*, . . . 2060*m* in the second device group 2060 via the network 2080.

Note that in a case where the text information relates to control of the devices 2060*a*, 2060*b*, . . . 2060*m* in the second device group 2060, and in a case where the devices 2060*a*, 2060*b*, . . . 2060*m* to be controlled are not targets to be directly controlled by the analysis server 2020, the text information is transmitted to the device server 2070 that controls the devices 2060*a*, 2060*b*, . . . 2060*m*. For example, in a case where the text information relates to an electric hot water supply apparatus, which is "heat up water at XX o'clock", the text information is transmitted to the device server 2070. Subsequently, the device server 2070 transmits the command to the devices 2060*a*, 2060*b*, . . . 2060*m* via the network 2080.

(6) Air-Conditioner Server

On the basis of the analysis result of the signal S by the analysis server 2020 (i.e., the text information generated by the analysis server 2020), transmitted from the analysis server 2020, and the information J regarding the state quantity related to at least one of the air conditioner 2010 and the air-conditioning target space, transmitted from the transmission unit 2016*a* of the air conditioner 2010 as appropriate, the air-conditioner server 2030 generates a command C. Subsequently, the air-conditioner server 2030 transmits the command C to the reception unit 2016*b* of the air conditioner 2010 via the network 2080. In this manner, the air-conditioner server 2030 serves as a device operating unit.

Note that the air-conditioner server 2030 herein generates the command C on the basis of, but not limited to, the information J in addition to the analysis result of the signal S by the analysis server 2020. The air-conditioner server 2030 may alternatively generate the command C on the basis of only the analysis result of the signal S by the analysis server 2020.

In addition, the air-conditioner server 2030 accumulates the signal S transmitted from the transmission unit 2016*a* of the air conditioner 2010 and performs various analyses using the signal S.

Note that the air-conditioner server 2030 is connected to the noise evaluation server 2200 that is adjacent and is connected with a wire, and transmits operation information of devices obtained from the analysis server 2020 or the device server 2070 to the noise evaluation server 2200. Details will be described later.

(7) Device Server

On the basis of the analysis result of the signal S by the analysis server 2020 (i.e., the text information generated by the analysis server 2020), transmitted from the analysis server 2020, the device server 2070 generates a command for the devices 2060*a*, 2060*b*, 2060*m* in the second device group 2060. Subsequently, the device server 2070 transmits the command to the devices 2060*a*, 2060*b*, . . . 2060*m* in the second device group 2060, which are operation targets, via the network 2080. In this manner, the device server 2070 serves as a device operating unit.

Note that the device server 2070 is one in FIG. 9. However, in a case where a plurality of types of devices 2060*a*, 2060*b*, . . . 2060*m* are to be operated by the device server 2070, the number of device servers 2070 is preferably equal to the number of the types.

In addition, in a case where all of the devices 2060*a*, 2060*b*, . . . 2060*m* are to be operated by commands from the analysis server 2020, the device server 2070 is not necessarily present.

(8) Infrared Transmitter

The infrared transmitter 2040 includes a memory (not illustrated) that stores a control infrared signal pattern for each of the devices 2050*a*, 2050*b*, . . . 2050*n* in the first device group 2050 and for each operation content. By using an infrared signal pattern stored in the memory, in accordance with a command transmitted from the analysis server 2020, the infrared transmitter 2040 transmits an infrared signal to the devices 2050*a*, 2050*b*, 2050*n* in the first device group 2050, which are operation targets.

(9) Noise Evaluation Server

The noise evaluation server 2200 can collect sound information related to the room R and can notify a surveillance terminal (e.g., computer) 2280 of information on a noise generation situation of a renter of the room R. The surveillance terminal 2280 is owned by an owner of the room R or a manager who is a management agent. In addition, the noise evaluation server 2200 can also notify a mobile terminal 2290 of a noise evaluation of the renter or collective housing. The mobile terminal 2290 is owned by a resident, who is the renter of the room R, or an applicant for occupation in the collective housing including the room R.

As described above, the noise evaluation server 2200 receives the noise data D transferred from the air-conditioner server 2030. The noise data D includes both data of the sound level of a human voice exceeding the predetermined level, time, and duration (hereinafter referred to as voice noise data) and data of the sound level of a sound other than a human voice exceeding the predetermined level, time, duration, and frequency analysis result (hereinafter referred to as non-voice noise data).

In addition, the noise evaluation server 2200 receives operation information of the devices 2050*a*, 2050*b*, . . . 2050*n* and 2060*a*, 2060*b*, . . . 2060*m* transmitted from the analysis server 2020 and the device server 2070.

Furthermore, the noise evaluation server 2200 receives operation information of the air conditioner 2010 from the air-conditioner server 2030.

Note that a high-capacity storage apparatus (storage unit) 2240 is provided in the noise evaluation server 2200, and the storage apparatus 2240 stores some databases D1 to D4 to be described later.

(9-1) Analysis Processing of Data of Sound Other than Voice by Data Processing Unit As illustrated in FIG. 12, the noise evaluation server 2200 receives the voice noise data and the non-voice noise data from the air conditioner 2010 (step S21), and receives operation information of the air conditioner 2010 and the devices 2050*a*, 2050*b*, . . . 2050*n* and 2060*a*, 2060*b*, . . . 2060*m* from the analysis server 2020, the air-conditioner server 2030, and the device server 2070 (step S22). This is as described above.

Upon obtaining the operation information in step S22, a data processing unit 2210 of the noise evaluation server 2200 inputs the operation information into the database D1 that accumulates operation histories of the air conditioner and the devices and adds new data to the previous data (step S23).

In step S24, the data processing unit 2210 collates information on the time at which the air conditioner 2010 and the devices 2050*a*, 2050*b*, . . . 2050*n* and 2060*a*, 2060*b*, . . . 2060*m* were operated, which is stored in the database D1, with information on the time included in the non-voice noise data received from the air conditioner 2010 via the air-conditioner server 2030. Subsequently, in step S25, the data processing unit 2210 determines which device produces the loud sound higher than or equal to the predetermined level included in the non-voice noise data. In addition to the collation of the times, by using the database D2 related to the operation sounds of the air conditioner 2010 and the devices 2050*a*, 2050*b*, . . . 2050*n* and 2060*a*, 2060*b*, . . . 2060*m*, the data processing unit 2210 also determines a source that produces the loud sound in the non-voice noise data on the basis of the result of frequency analysis of the sound higher than or equal to the predetermined level included in the non-voice noise data.

In fact, there are a large number of types (different makers, capacities, grades, and the like) of each of the devices such as an air conditioner, a washing machine, a hot water supply apparatus, and a ventilation fan. The database D2 stores characteristics information such as frequency characteristics of an operation sound related to each of the large number of models of several tens of devices. The noise evaluation server 2200 initially registers, for example, model numbers of devices in each room R and applies data that is different for each room R in detailed analysis by the data processing unit 2210.

Furthermore, the database D2 also stores data of frequency characteristics of a sound of a person jumping on the floor and a sound of a person hitting a wall. Such data is classified according to the material of the floor of the room R, the size or thickness of the wall, and the like, and data that is different for each room R is stored.

In step S26, the data processing unit 2210 inputs the data of sound other than voice to each of the databases D3 and D4 in the form distinguished for each source of the sound. Specifically, examples of the source of the sound include a sound of stepping or hitting a wall of the renter of the room R, a sound produced from a television or audio equipment the volume of which is turned up by the renter, a sound of a washing machine or cleaner operated by the renter, and the like. In addition, the data processing unit 2210 also inputs the voice noise data received from the air conditioner 2010 to the databases D3 and D4 as well. Input items are the level (volume), occurrence time, duration, and the like of each source of the sound.

Note that the database D3 of a noise history of collective housing and the database D4 of a noise history of each renter store the same noise data items. However, while the database D3 is associated with various types of data for identifying the collective housing or its manager (e.g., address, surrounding environment, and location), the database D4 is associated with personal information of the renter of the room R (e.g., email address of a mobile terminal).

(9-2) Generation of Noise Evaluation of Collective Housing by Information Generating Unit In step S27, on the basis of the information stored in the database D3, an information generating unit 2220 generates a noise evaluation of each collective housing including a plurality of rooms R. For example, for collective housing including twenty rooms R, in a case where the noise level of renters of the rooms R is quieter than an average level, an evaluation that the collective housing is generally quite is generated. In addition, for a person who wishes to occupy a room R of the collective housing, the information generating unit 2220 can also generate noise information regarding neighboring rooms of the desired room.

The information generating unit 2220 inputs the generated information to the database D3 of the noise history of collective housing and updates the database D3.

(9-3) Generation of Renter's Noise Information by Information Generating Unit

In step S28, on the basis of the information stored in the database D4, the information generating unit 2220 generates noise information regarding each renter. For example, for a certain renter, a monthly average noise level is continuously stored, and a record of the renter's noise level in a new room R is continuously stored even after moving. Thus, the renter can have history data for the past several years regarding noise. Indication of this history data helps the renter, who wishes to move, to rent a new room with ease.

The information generating unit 2220 inputs the generated information to the database D4 of the noise history of the renter and updates the database D4.

(9-4) Presentation of Noise Evaluation or Noise Information by Information Generating Unit In step S29, it is determined whether a manager, renter, or the like of the room R has requested presentation of the noise information. This request is, for example, a request in a web browser in a case where the noise evaluation server 2200 provides information on the web or a request in an application in a case where a dedicated application is installed in a mobile terminal.

If it is determined in step S29 that the request has been made, the information generating unit 2220 presents the generated noise evaluation of the collective housing or the noise information regarding the renter to the manager, renter, or the like of the room R (step S30). The presented information can be viewed by using, for example, the surveillance terminal 2280 or the mobile terminal 2290 owned by the manager, renter, or the like of the room R. For what is to be presented, the manager and renter of the room R make a contract in the first place. For example, the renter can stipulate not to present the personal noise information to any one else but the manager of the room R.

(10) Features of Device Control System (10-1)

In the device control system 2001 also serving as the information providing system that provides information regarding the room R, sounds measured by the microphones 2140 of the air conditioner 2010 are analyzed by the sound processing chip 2170 of the air conditioner 2010 and the data processing unit 2210 of the noise evaluation server 2200. From sounds exceeding the predetermined level, a sound that is determined by the sound processing chip 2170 as a human voice and a sound that is determined by the data processing unit 2210 as a sound due to an action of a renter in the room are extracted. Examples of the sound due to an action of a renter in the room R include a sound of stepping or hitting a wall of the renter of the room R, a sound produced from a television or audio equipment the volume of which is turned up by the renter, a sound of a washing machine or cleaner operated by the renter, and the like.

Subsequently, by using the noise data of a human voice and information of the sound due to an action of a renter in the room R, which are extracted by the sound processing chip 2170 and the data processing unit 2210, the information generating unit 2220 of the noise evaluation server 2200 generates information regarding the room R. Herein, as the information regarding the room R, the information generating unit 2220 generates a noise evaluation of the collective housing and noise information regarding the renter.

These evaluation and information regarding the noise in the room R are useful information for both the manager of the room R and the renter of the room R. For example, in a position of the manager of the room R, it is possible to determine whether the renter in the room R is preferable in terms of noise and to give caution as necessary, for example.

Note that the noise evaluation of the collective housing and the noise information regarding the renter preferably include an occurrence time, a sound level, and the like of each source of the noise.

(10-2)

In the device control system 2001, the data processing unit 2210 of the noise evaluation server 2200 includes the database D1 that accumulates operation histories of the air conditioner 2010 and the devices. In addition, on the basis of the time of each operation command and the time at which noise was measured, the data processing unit 2210 recognizes the device that has produced a sound. Collation of the times makes it easier to recognize the sound that the device has produced. Even if it is difficult to identify the device only by using a frequency analysis result of the sound, this increases the accuracy of the evaluation or information regarding the noise generated by the information generating unit 220.

(10-3)

In the device control system 2001, as described above, the noise data of a human voice is distinguished from the information of a sound due to an action of a renter in the room R, and on the basis of these, the noise evaluation of the collective housing and the noise information regarding the renter are generated. Thus, for example, the noise information regarding whether the renter in the room R is preferable in terms of noise can include whether the voice of the renter is loud or the noise of a device operated by the renter is loud.

(10-4)

In the device control system 2001, the air conditioner 2010 including the microphones 2140 is provided in each of the rooms R of the collective housing and sounds are measured in the plurality of rooms R. On the other hand, the noise evaluation server 2200 is provided at a position distant from the rooms R. Thus, the noise evaluation server 2200 can collect sound data from the large number of rooms R of the collective housing and can enhance a sound analysis capability by using a learning function, for example.

In addition, the high-capacity storage apparatus (storage unit) 2240 is provided in the noise evaluation server 2200, and the storage apparatus 2240 stores the databases D1 to D4 to be described later. Thus, the noise evaluation server 2200 can easily perform a detailed analysis of sounds that the sound processing chip 2170 and the controller 2018 of the air conditioner 2010 in each room R cannot analyze with their capabilities.

(10-5)

In the device control system 2001, the noise evaluation of the collective housing and the noise information regarding the renter generated by the information generating unit 2220 can be viewed by the manager or renter of the room R by using their surveillance terminal 2280 or mobile terminal 2290. Thus, the manager or renter of the room R can check the evaluation information from the information generating unit 2220 by using the mobile terminal 2290 or the like.

Thus, for example, if an owner who runs a rental apartment knows an evaluation regarding noise of the renter who rents the room R, they can give caution to the renter in order to stop the noise for the neighbors of the room R. In addition, the following advantage can be expected. For example, if the renter who wishes to newly rent the room R obtains their previous evaluation history regarding noise and presents it to a lender of the next room so as to rent the room with ease.

(11) Modifications (11-1)

In the above embodiment, the noise data of a human voice and the information of a sound due to an action of a renter in the room R are distinguished from each other, and on the basis of this, the noise evaluation of the collective housing or the noise information regarding the renter is generated. However, the noise information may be generated only on the basis of the noise data of a human voice.

Conversely, the noise information may be generated only on the basis of the information of a sound due to an action of a renter in the room R.

In either case, it is possible to give caution to the renter, for example, by using the evaluation information, and in a case of good evaluation information, it is also advantageous for the renter.

(11-2)

The above embodiment does not take sounds produced outside the room R into account. However, in a case where the room R is in an environment where sounds the volume of which is a predetermined level or higher are heard from outside the room R, it is preferable that the noise outside the room R be able to be recognized by the data processing unit 2210 and that a history of the outside noise be stored in a database.

In this case, by also collating the time of the outside noise, the data processing unit 2210 corrects the noise data of a human voice or the data of a sound due to an action of a renter in the room R. That is, even if the room R is located in a surrounding environment where the outside noise is loud, it is possible to remove the influence of noise that is not produced by the renter in the room R and to accurately generate an evaluation regarding the noise of the renter in the room.

In addition, it is preferable to evaluate sound information as in the above embodiment for the outside noise stored in the database. Thus, in a case where noise exceeding a predetermined noise level occurs, it is possible to provide information of an event that is happening outside the room R to the inside of the room R, such as whether the noise is due to rain or a traffic accident, and to give advice for bringing an umbrella, for example.

(11-3)

The above embodiment has described the room R of collective housing (apartment or condominium) including a plurality of rooms each of which is of a one-room type. However, even if the collective housing is for family-use, where a plurality of family members share some rooms, the present invention is also applicable.

In this case, the sound processing chip may recognize the family members by their way of speech or the like, and the noise information of each of the members may be generated or the noise information of the whole family may be generated.

(11-4)

In the above embodiment, the microphones 2140 that measure sounds in the room R are incorporated in the air conditioner 2010. Instead, a dedicated microphone-incorporated device may be provided in the room R and may be connected to a network, or a microphone may be incorporated in other devices, such as a ceiling light.

(11-5)

The above embodiment has described that the noise information is provided to the manager of specific collective housing. However, it is also considered that a history of the renter's noise information is provided to, for example, a manager of a real estate network. For example, in a case of lending a room to a foreigner, it is difficult to lend the room if there is no information. However, if the foreigner has a history of previous noise information and the information is good and trustful, both the lender and renter can have benefits.

(11-6)

The above embodiment has described measurement of sounds in a case where the renter is in the room R. However, it is also effective to measure and analyze sounds when the renter is absent from the room R.

If sounds are measured for a couple of days to measure sounds of air planes, trains, elevators, and the like before lending the room R, this measurement can be taken into account for generating the noise evaluation and the like after lending.

In addition, registration in the noise evaluation server 2200 in advance and determination regarding whether the room R is a room of an apartment or a room of a condominium to correct the noise evaluation are also effective.

In addition, in the correction of the noise evaluation, it is preferable to register, in addition to information regarding the structure of a building such as whether the building (e.g., collective housing) including the room R is made of wood or reinforced concrete, information regarding sound insulation performance of walls, ceilings, floors, and the like of the building and the room R. Thus, it is possible to appropriately remove the influence of noise that is not produced by the renter in the room R in consideration of the degree of influence of noise on the inside of the room R and to correctly evaluate the noise of the renter of the room R.

(11-7)

The above embodiment has described the room R of collective housing (apartment or condominium) as an example. However, in addition to this, the present invention is also applicable to a room of a hotel, a room of an inpatient unit in a hospital, and the like.

(11-8)

The above embodiment has described that an owner who runs a rental apartment can give caution to the renter in order to stop the noise for the neighbors of the room R if the noise evaluation of the renter of the room R is bad. Additional information related to this may be added to the noise information by information generating unit 220. For example, the information generating unit 2220 can add, as the additional information, detailed caution (or advice) based on sound analysis, such as loud voice, loud audio sound, or operation of a cleaner or washing machine at night, instead of merely giving caution of a high noise level.

The renter given such caution can check it on a mobile terminal or the like at any time and can be expected to refrain from an annoying action.

(11-9)

In the above embodiment, sounds measured by the microphones 2140 of the air conditioner 2010 are analyzed by the sound processing chip 2170 of the air conditioner 2010 and the data processing unit 2210 of the noise evaluation server 2200. However, the analysis processing may be performed by one of them. For example, data of sounds collected by the microphones 2140 may be transmitted to the noise evaluation server 2200 in real time so that all the sounds may be analyzed by the data processing unit 2210. In this case, the communication volume via the network 2080 is increased compared with that in the above embodiment, but this disadvantage can be reduced by a data compression technique or the like.

In addition, in the above embodiment, the microphones 2140 are provided in the room R, and the data processing unit 2210 of the noise evaluation server 2200 provided outside the room executes various kinds of analysis processing. However, a high-performance computer may be provided in the room R of collective housing so as to perform all data analysis processing.

Furthermore, in the above embodiment, the information generating unit 2220 of the noise evaluation server 2200 provided outside the room generates the noise evaluation of the collective housing and the noise information of the renter. However, a computer may be provided in the room R so that the information providing system can be complete within the room R.

[Third Configuration]

Now, a device control system according to a third configuration will be described with reference to drawings.

First Embodiment (1) Configuration of Device Control System 3001

FIG. 13 is a schematic diagram illustrating a concept of a device control system 3001 and an abnormality processing system 3003 according to a first embodiment. FIG. 14 is a schematic diagram illustrating the configuration of the device control system 3001 and the abnormality processing system 3003 according to the same embodiment.

The device control system 3001 includes a sound input apparatus 3060 and a server 3100. In the device control system 3001, a user 3005 can input a control command to the sound input apparatus 3060 so as to control a predetermined control device. The control device herein is provided in a space O. In addition, the abnormality processing system 3003 includes a device control system 1 and a device 3020 that can execute abnormality processing. However, the configuration of the abnormality processing system 3003 is not limited to this and may include the sound input apparatus 3060 and the device 3020.

Although FIGS. 13 and 14 each illustrate the single sound input apparatus 3060, the number of apparatuses is not limited to this. The server 3100 can be connected to any number of apparatuses and can manage the apparatuses.

The device 3020 is directly controlled by the server 3100 via a network NW. The device 3020 may be an electric fan 3020a, a lighting device 3020b, a television 3020c, an air conditioner 3020d, or the like. The device 3020 herein includes a communication unit 3023 and a processing unit 3025. The communication unit 3023 enables communication with the server 3100 via the network NW. This function of the communication unit (accepting unit) 3023 enables the device 3020 to accept an abnormality processing command in response to an abnormal sound produced in a space R where the sound input apparatus 3060 is provided. The processing unit 3025 enables execution of information processing in the device 3020. By the function of the processing unit (abnormality processing executing unit) 3025 herein, the device 3020 executes abnormality processing. The "abnormality processing" is an operation performed for the device 3020 in response to reception of the abnormality processing command and differs for each type of abnormal sound and device. For example, in a case where the abnormal sound indicates a fire and the device 3020 is a television, processing is executed to display "there is a fire in a position where the sound input apparatus 3060 is provided" or the like on a screen. In addition, for example, in a case where the abnormal sound indicates a fire and the device 3020 is an air conditioner, processing is executed to switch to a "pump-down operation". Other examples of the abnormality processing will be described later. Note that numeral 3020 denotes a given device, and lowercase suffixes are given for individual devices in the following description.

The sound input apparatus 3060 accepts an input of a control command for a predetermined device 3020. The sound input apparatus 3060 herein includes a microphone and can accept, by speech input through the microphone, the control command for the device 3020 from the user 3005. Subsequently, the sound input apparatus 3060 transmits, to the server 3100, sound information corresponding to the accepted speech input. Note that the server 3100 determines whether the sound information includes the control command. Thus, if the sound input apparatus 3060 detects a speech spoken by the user 3005, the sound input apparatus 3060 directly transmits the sound information to the server 3100.

Note that the space R where the sound input apparatus 3060 is provided and the space O where the device 3020 is provided are the same space herein.

As illustrated in FIG. 15, the server 3100 includes an input unit 3101, an output unit 3102, a communication unit 3103, a storage unit 3104, and a processing unit 3105 and is connected to the sound input apparatus 3060 via the network NW such as the Internet.

Herein, the input unit 3101 is realized by a given input apparatus and enables inputs of various kinds of information to the server 3100. The output unit 3102 is realized by a given output apparatus and outputs various kinds of information from the server 3100. The communication unit 3103 is configured from a given communication apparatus and is connected to the external network NW to enable information communication.

The storage unit 3104 is realized by a read-only memory (ROM), a random access memory (RAM), or the like and stores information to be input to the server 3100, information to be calculated by the server 3100, and the like. In addition, the storage unit 3104 stores a "device database (DB) 3104K" and an "abnormal sound database (DB) 31041".

In the device DB 3104K, individual information of each device 3020 is managed. For example, the device DB 3104K stores identification information assigned to the device 3020 and identification information assigned to the sound input apparatus 3060 in association with each other. By using device DB 3104K, the device 3020 to be operated by speech input to the sound input apparatus 3060 is identified.

The abnormal sound DB 31041 stores an abnormality processing execution command to be executed by the device 3020 in association with sound information of the abnormal sound and the device 3020, the abnormal sound being produced in response to an abnormality assumed in a position where the sound input apparatus 3060 is provided. For example, as illustrated in FIG. 16, the abnormal sound DB 31041 stores an execution command of a pump-down operation as abnormality processing in a case where the abnormal sound is sound information corresponding to a fire and the device 3020 is an air conditioner 3020d1. In addition, the abnormal sound DB 31041 stores an execution command of abnormality display as abnormality processing in a case where the abnormal sound is sound information corresponding to a fire and the device 3020 is a television 3020c2. Furthermore, the abnormal sound DB 31041 stores an execution command of an ejecting operation (refer to description below) as abnormality processing in a case where the abnormal sound is sound information corresponding to an earthquake and the device 3020 is an air conditioner 3020*d2*. Furthermore, the abnormal sound DB 31041 stores an execution command of abnormality display as abnormality processing in a case where the abnormal sound is sound information corresponding to an earthquake and the device 3020 is a television 3020*c1*.

The processing unit 3105 is realized by a CPU, a graphic processing unit (GPU), a cache memory, or the like and executes information processing in the server 3100. The processing unit 3105 herein executes a program stored in the storage unit 3104 so as to serve as "input analyzing unit 3110", "control details identifying unit 3120", "control unit 3135", or "abnormal sound determining unit 3145".

The input analyzing unit 3110 analyzes details of an input received from the sound input apparatus 3060. For example, in a case where the sound input apparatus 3060 accepts a speech input, details of the speech input are converted into text information and analyzed. Note that in a case where details of the speech input are analyzed, the input analyzing unit 3110 can perform a highly accurate analysis by using a recurrent neural network or the like.

The control details identifying unit 3120 identifies control details including a control device and a control command from the result of analysis by the input analyzing unit 3110. For example, in a case where the sound input apparatus 3060 accepts a speech input, the control details identifying unit 3120 determines whether the text information obtained by conversion by the input analyzing unit 3110 includes linguistic information corresponding to the control device and the control command to identify the control details.

In a case where the control details identifying unit 3120 identifies control details regarding the device 3020, on the basis of the control details, the control unit 3135 controls the device 3020 via the network NW.

The abnormal sound determining unit 3145 determines a predetermined abnormal sound from the sound information obtained through the sound input apparatus 3060. If the abnormal sound is determined, the abnormal sound determining unit 3145 extracts a corresponding abnormality processing command from the abnormal sound DB 31041 and transmits it to the device 3020 through the communication unit 3103. For example, in a case where sound information corresponding to a fire is detected, the server 3100 transmits an abnormality processing command including an execution command of a pump-down operation to the device 3020.

(2) Operations of Device Control System 1

FIG. 17 is a sequence diagram illustrating operations of the device control system 1 according to this embodiment.

First, the user 3005 performs a speech input to the device 3020 by using the sound input apparatus 3060 (S1). Subsequently, the sound input apparatus 3060 transmits, to the server 3100, input information corresponding to the accepted speech input (S2).

Subsequently, the server 3100 receives the input information (S3) and analyzes details of the input (S4). Subsequently, the server 3100 identifies control details including the device 3020 and a control command for the device 3020 (S5). On the basis of the control details, the server 3100 controls the device 3020 via the network NW (S6, S7).

Note that in a case where the device 3020 is to be controlled by speech input, the amount of information processing may be enormous. Even in such a case, the device control system 3001 can perform a highly accurate speech analysis by using the server 3100 that realizes a deep neural network established on the network NW, for example. Thus, even in a case of speech input, the device 3020 and the control command can be finely identified.

(3) Operations of Abnormality Processing System 3003

FIG. 18 is a sequence diagram illustrating operations of the abnormality processing system 3003 according to this embodiment. Note that the device 3020 that can execute abnormality processing is used as a control device, and the device 3020, the sound input apparatus 3060, and the server 3100 realize the abnormality processing system 3003. Note that the configuration of the abnormality processing system 3003 is not limited to this.

In a state where a speech input is acceptable by the sound input apparatus 3060 (speech input acceptable mode) in the abnormality processing system 3003, sound information is transmitted to the server 3100 through the sound input apparatus 3060 at any time (T1, T2).

Subsequently, the server 3100 receives the input sound information (T3) and analyzes details of the sound information (T4). Herein, from the analysis result of the sound information, the server 3100 determines whether an abnormal sound indicating an abnormality in the space R where the sound input apparatus 3050 is provided is included (T5). If an abnormal sound is detected in the input sound information, the server 3100 transmits an abnormality processing command in response to the abnormal sound to the device 3020 (T5-Yes, T6).

Subsequently, upon reception of the abnormality processing command, the device 3020 executes abnormality processing in response to the abnormality processing command (T7, T8).

(4) Features (4-1)

As described above, the device 3020 according to this embodiment accepts a control command from the server 3100 that outputs the control command in accordance with a speech input obtained through the sound input apparatus 3060 (sound input accepting apparatus). In addition, the device 3020 receives an abnormality processing command in response to an abnormal sound produced in the space R where the sound input apparatus 3060 is provided and executes abnormality processing in accordance with the abnormality processing command. With such a configuration, the device 3020 is controlled to be in an optimal state in case of an abnormality.

For example, in a case where the device 3020 is an air conditioner or a television including a remote controller having a screen (display) and a word indicating a fire ("fire") or a word indicating an earthquake ("earthquake") is employed as an abnormal sound, as abnormality processing in response to such an abnormal sound, indication corresponding to the abnormal sound information (e.g., "there is a fire" or "there is an earthquake") can be displayed on the screen. Thus, even in a case where the space R where the sound input apparatus 3060 is provided and the space O where the device 3020 is provided differ from each other, a user of the device 3020 can be immediately notified of occurrence of an abnormality such as a fire or an earthquake.

(4-2)

The abnormality processing system 3003 according to this embodiment includes the sound input apparatus 3060 (sound input accepting apparatus) that accepts a speech input and the device 3020. The device 3020 accepts a control command from the server 30100 that outputs the control command in accordance with the speech input obtained through the sound input apparatus 3060. In addition, the device 3020 accepts an abnormality processing command in response to an abnormal sound produced in the space R where the sound input apparatus 3060 is provided and executes abnormality processing in accordance with the abnormality processing command. Thus, it is possible to provide the abnormality processing system 3003 that can set the device in an optimal state in case of an abnormality.

In addition, the abnormality processing system 3003 includes the server 3100 that outputs a control command in accordance with the speech input obtained through the sound input apparatus 3060. Since the server 3100 is present on the network NW, it is easy to adjust computational resources. As a result, it is possible to perform a highly accurate analysis of speech information.

In addition, in the abnormality processing system 3003, the server 3100 includes the abnormal sound determining unit 3145 and the communication unit (transmission unit) 3103. The abnormal sound determining unit 3145 determines a predetermined abnormal sound from sound information obtained through the sound input apparatus 3060. The communication unit 3103 transmits an abnormality processing command in response to the abnormal sound to the device 3020. Thus, the abnormality processing command can be executed by using the server 3100 on the network NW.

Note that the abnormality processing system 3003 includes the device 3020, the sound input apparatus 3060, and the server 3100 in the above description. However, the abnormality processing system 3003 is not limited to such a configuration. As will be described later, the abnormality processing system 3003 may include the device 3020 and the sound input apparatus 3060.

(5) Modifications

(5-1) Modification A

Although the sound input apparatus 3060 and the device 3020 are separate apparatuses in the above description, the sound input apparatus 3060 and the device 3020 may be integrated. Specifically, the sound input apparatus 3060 may be incorporated in the device 3020. With such a configuration, it is possible to provide the device 3020 that can be controlled by speech input during normal times and that executes abnormality processing in case of an abnormality.

(5-2) Modification B

The above-described abnormal sound determining unit 3145 may include a function for excluding predetermined sound information as an excluded sound from an abnormal sound when determining the abnormal sound. For example, the abnormal sound determining unit 3145 may include a function for excluding sound information that is output from a television as an excluded sound. Thus, it is possible to avoid execution of abnormality processing in a case where sound information corresponding to an abnormal sound such as "fire" or "earthquake" is produced from the television or the like even when no abnormality (e.g., fire or earthquake) occurs in reality. As a result, it is possible to increase the reliability of the abnormality processing system 3003.

(5-3) Modification C

In the above-described abnormality processing system 3003, the sound input apparatus 3060 may be switched to a suspended state in which transmission of sound information corresponding to a speech input is suspended. Furthermore, even in the suspended state, in a case where predetermined sound information is obtained, the sound input apparatus 3060 may transmit the obtained sound information to the server 3100.

Specifically, as illustrated in FIG. 19, the sound input apparatus 3060 detects sound information at any time even in the suspended state in which transmission of sound information corresponding to a speech input is suspended (C1, C2). Subsequently, if it is determined that the detected sound information corresponds to predetermined release sound information, the sound input apparatus 3060 releases the suspended state (C2-Yes, C3). If the suspended state is released, the sound input apparatus 3060 transmits the detected sound information to the server 3100 at any time (C4, C5). Subsequently, the same process as that in the above-described steps T4 to T8 is performed in steps C6 to C10.

Thus, with the abnormality processing system 3003 according to Modification C, it is possible to set the suspended state while the sound input apparatus 3060 is not used. On the other hand, in case of emergency in which an abnormal sound is produced, the device 3020 can immediately execute abnormality processing.

(5-4) Modification D

In addition, the device 3020 can be switched to a stopped state in which acceptance of a control command is stopped. Furthermore, even in the stopped state, in a case where an abnormality processing command is accepted, the device 3020 may execute abnormality processing. With such a configuration, the stopped state can be set while the device 3020 is not used. On the other hand, in case of emergency in which an abnormality processing command is accepted, the device 3020 can immediately execute abnormality processing.

(6) Application to Air Conditioner

The air conditioner 3020d having a refrigerant circuit illustrated in FIG. 20 or FIG. 21 can be employed as the device 3020 in the abnormality processing system 3003.

In the refrigerant circuit herein illustrated in FIG. 20, an outdoor unit 220 and an indoor unit 3240 are connected to each other via refrigerant pipes 3211 and 3212 and shutoff valves 3213 and 3214. The outdoor unit 3220 mainly includes a compressor 3221, a four-way switching valve 3222, an outdoor heat exchanger 3223, an outdoor fan 3224, an expansion mechanism 3225, and the like. The indoor unit 3240 mainly includes an indoor heat exchanger 3241, an indoor fan 3242, and the like. Note that the "expansion mechanism" in this embodiment refers to a mechanism that can decompress a refrigerant and corresponds to, for example, an expansion valve or a capillary tube. In addition, the refrigerant circuit illustrated in FIG. 21 is obtained by adding a release valve 3244 to the refrigerant circuit illustrated in FIG. 20.

(6-1) Application Example 1

The air conditioner 3020d1 including the refrigerant circuit illustrated in FIG. 20 and using a flammable refrigerant or a slightly flammable refrigerant can be employed as the device 3020. In addition, a word indicating a fire ("fire"), a word indicating an earthquake ("earthquake"), or the like can be employed as an abnormal sound. Furthermore, execution of a pump-down operation can be employed as abnormality processing in response to such an abnormal sound. The "pump-down operation" refers to an operation in which the refrigerant is concentrated in the outdoor unit 3220 of the air conditioner 3020d1. Specifically, the pump-down operation is executed by setting a cooling cycle operation and fully closing the expansion mechanism 3225. Upon execution of the pump-down operation, the refrigerant moves to an outdoor space P, and thus, the refrigerant in an indoor space O can be suppressed from being ignited in case of a fire, for example. In addition, a secondary disaster can be suppressed from occurring in case of an earthquake.

(6-2) Application Example 2

The air conditioner 3020d2 including the refrigerant cycle illustrated in FIG. 20 and the outdoor unit 3220 using a flammable refrigerant or a slightly flammable refrigerant can also be employed as the device 3020. In addition, a word indicating a fire ("fire"), a word indicating an earthquake ("earthquake"), or the like can be employed as an abnormal sound. Furthermore, an outdoor releasing operation in which the refrigerant is released to the space P where the outdoor unit 3200 is provided can be employed as abnormality processing in response to such an abnormal sound. The "outdoor releasing operation" is, for example, executed by opening the shutoff valves 3213 and 3214 of the outdoor unit 3220 and ejecting the flammable refrigerant or slightly flammable refrigerant into the atmosphere. By such an outdoor releasing operation, the refrigerant in the indoor space O can be suppressed from being ignited in case of a fire, for example. In addition, a secondary disaster can be suppressed from occurring in case of an earthquake.

(6-3) Application Example 3

An air conditioner including the refrigerant circuit illustrated in FIG. 21 and the indoor unit 3240 using a $CO_2$ refrigerant can also be employed as the device 3020. In addition, a word indicating a fire ("fire") or the like can be employed as an abnormal sound. Furthermore, an ejecting operation in which the $CO_2$ refrigerant is ejected into the space where the indoor unit 3240 is provided can be employed as abnormality processing in response to such an abnormal sound. The "ejecting operation" is executed by opening the release valve 3244 and ejecting the $CO_2$ refrigerant into the space. Note that the release valve 3244 is preferably provided at a position where the pressure is low during normal operation and a position where the pressure is high by stopping the indoor fan 3242 during opening.

Such an ejecting operation can fill the space with $CO_2$ and can encourage fire extinguishing. In a case where the space O where the indoor unit 3240 is provided is a narrow space, the fire extinguishing effect can be particularly enhanced.

Second Embodiment

FIG. 22 is a schematic diagram illustrating the configuration of a device control system 1S and an abnormality processing system 3S according to a second embodiment. Note that substantially the same numeral denotes the same part that has been already described, and a repeated description will be omitted in the following description. In addition, a suffix S may be given in this embodiment in order to be distinguished from the other embodiments.

A sound input apparatus 3060S according to the second embodiment includes a communication unit 3063 and a processing unit 3065.

The communication unit 3063 includes a given communication apparatus and enables communication with the device 3020. By a function of the communication unit 3063 (accepting-side transmission unit), an abnormality processing command in response to an abnormal sound determined by the processing unit 3065 is transmitted to the device 3020 to be controlled.

The processing unit 3065 is realized by a CPU, a cache memory, or the like and executes various kinds of information processing. The processing unit 3065 herein outputs, for specific sound information corresponding to a specific operation in input sound information, a control command corresponding to the specific operation to the device 3020 without accessing the server 3100. In addition, the processing unit 3065 (accepting-side determination unit) has a function for detecting a predetermined abnormal sound from the input sound information. Furthermore, if sound information corresponding to the abnormal sound is detected in the input sound information, the processing unit 3065 outputs an abnormality processing command in response to the abnormal sound to the device 3020 without accessing the server 3100. Note that the output control command and abnormality processing command are transmitted to the device 3020 through the communication unit 3063.

FIG. 23 is a sequence diagram illustrating operations of the device control system 3001S according to this embodiment. In the device control system 3001S, the sound input apparatus 3060S is used by the user 3005 and a speech input to the device 3020 is performed (U1). Subsequently, the sound input apparatus 3060S determines whether the speech input corresponds to a specific operation (U2). If it is determined that the speech input corresponds to a specific operation, the sound input apparatus 3060S transmits a control command corresponding to the specific operation to the device 3020 (U2-Yes, U3). Upon reception of the control command, the device 3020 performs the specific operation corresponding to the control command (U4, U5). Note that if it is not determined in step U2 that the speech input corresponds to a specific operation, the sound input apparatus 3060S transmits, to the server 3100, speech information corresponding to the speech input (U2-No). In this case, the same process as that in steps S3 to S7 is performed subsequently.

In the above manner, the device control system 3001S according to this embodiment executes analysis processing in the sound input apparatus 3060S for speech analysis for which the load of the amount of information processing is low. Thus, access to the network NW is avoided, and the device is operated at a high speed. On the other hand, for speech analysis for which the load of the amount of information processing is high, by using the server 3100, the speech information can be analyzed with a high accuracy. Note that the server 3100 realizes a deep neural network or the like on the network NW.

FIG. 24 is a sequence diagram illustrating operations of the abnormality processing system 3S according to this embodiment. Herein, the sound input apparatus 3060S is in a suspended state in which transmission of sound information corresponding to a speech input is suspended (D1). Even in such a suspended state, the sound input apparatus 3060S detects sound information generated in the periphery at any time (D2). Subsequently, if it is determined that the detected sound information corresponds to specific release sound information, the sound input apparatus 3060 releases the suspended state (D2-Yes, D3). If the suspended state is released, the sound input apparatus 3060 determines whether the release sound information is predetermined abnormal sound information (D4). If it is determined that the release sound information is predetermined abnormal sound information, the sound input apparatus 3060S transmits, to the device 3020, an abnormality processing command in response to the abnormal sound (D4-Yes, D5). Upon reception of the abnormality processing command, the device 3020 executes abnormality processing corresponding to the abnormality processing command (D6, D7).

In the above manner, in the abnormality processing system 3S according to this embodiment, if an abnormal sound for the device 3020 is detected, the sound input apparatus 3060 transmits an abnormality processing command to the device 3020. Thus, without accessing the server 3100 on the network NW, the device 3020 can execute abnormality processing. Thus, it is possible to provide the abnormality processing system 3003S that can immediately realize abnormality processing of the device 3020.

As supplemental remarks, in a case where the device 3020 is to be controlled by speech input, the amount of information processing is enormous, and thus, a speech analyzing apparatus (server) on the network NW may be used. In contrast, in the abnormality processing system 3003S according to this embodiment, analysis processing is executed in the sound input apparatus 3060 for speech analysis for which the load of the amount of information processing is low. Thus, access to the network NW is avoided, and abnormality processing of the device 3020 can be immediately realized.

OTHER EMBODIMENTS

The embodiments have been described above. However, it should be understood that various modifications can be made on the form or details without departing from the spirit and scope of the claims.

That is, the present disclosure is not limited to the above embodiments without any change. The present disclosure can be embodied by deforming any of the components without departing from the spirit thereof. In addition, the present disclosure can generate various disclosures by appropriately combining a plurality of components disclosed in the above embodiments. For example, some of all the components illustrated in the embodiments may be deleted. Furthermore, components may be appropriately combined with a different embodiment.

REFERENCE SIGNS LIST

[First Configuration]
  1040 server
  1050 network
  1060 building
  1061 router
  1062 air conditioner
  1063 sound input/output apparatus
  1064 sound input unit
  1065 sound output unit
  1090 management system
  CM command
  OS operation sound data
  OI operation information
  OD output data
  SD sound data
[Second Configuration]
  2001 device control system (information providing system) including information providing system
  2020 analysis server (device operating unit)
  2030 air-conditioner server (device operating unit)
  2070 device server (device operating unit)
  2140 microphone (measurement unit)
  2170 sound processing chip (data processing unit)
  2210 data processing unit
  2220 information generating unit
  2240 storage apparatus (storage unit)
  2280 surveillance terminal (information terminal)
  2290 mobile terminal (information terminal)

[Third Configuration]
  3001 control system
  3001S control system
  3003 abnormality processing system
  3003S abnormality processing system
  3005 user
  3020 device
  3023 communication unit (accepting unit)
  3025 processing unit (abnormality processing executing unit)
  3060 sound input apparatus (sound input accepting apparatus)
  3060S sound input apparatus (sound input accepting apparatus)
  3063 communication unit (accepting-side transmission unit)
  3065 processing unit (accepting-side determination unit)
  3100 server
  3101 input unit
  3102 output unit
  3103 communication unit (transmission unit)
  3104 storage unit
  3105 processing unit (abnormal sound determining unit)
  3110 input analyzing unit
  3120 control details identifying unit
  3135 control unit
  3145 abnormal sound determining unit
  R space (space where sound input apparatus is provided)
  O space (space where device is provided, space where indoor unit is provided)
  P space (space where outdoor unit is provided)
  NW network

CITATION LIST

Patent Literature

[PTL 1] Japanese Unexamined Patent Application Publication No. 2001-285969
[PTL 2] Japanese Patent No. 5963155
[PTL 3] Japanese Unexamined Patent Application Publication No. H06-027986

The invention claimed is:

1. A management system comprising:
an air conditioner;
a sound input unit that is provided in a room where the air conditioner is provided and obtains sound data;
an operation sound analyzing integrated circuit that analyzes an operation sound of the air conditioner included in the sound data by a predetermined analysis method so as to obtain a determination result regarding whether an abnormality exists regarding operation of the air conditioner or details of an abnormality regarding operation of the air conditioner;
a first processor that performs first preprocessing on the sound data;
a command extracting integrated circuit that extracts a command of a user from the sound data that has been subjected to the first preprocessing; and
a control unit that controls the air conditioner on the basis of the command.

2. The management system according to claim 1, wherein the first processor extracts a component related to a frequency band of a human voice from the sound data.

3. The management system according to claim 2, further comprising:
an operation sound data accumulating computer storage that accumulates the operation sound, the operation sound analyzing integrated circuit analyzing data of the operation sound previously accumulated in the operation sound data accumulating computer storage and data of the most recent operation sound so as to obtain the determination result.

4. The management system according to claim 3, further comprising:

a second processor that performs second preprocessing on the sound data, the second processor extracting the operation sound from the sound data, and the operation sound data accumulating unit accumulating the operation sound extracted from the second processor.

5. The management system according to claim 1, wherein the sound input unit further includes a sound gate unit that transmits or blocks the sound data, and upon recognition of a predetermined keyword spoken by the user, the sound gate unit allows the sound data to pass therethrough for a predetermined period.

6. An information providing system that provides information regarding a room, the information providing system comprising:

a microphone that continuously accepts a sound in the room to generate sound data;

a sound processing chip that analyses the sound data when a sound level of the sound data exceeds a predetermined level to extract a first sound that is a voice spoken by a person in the room and/or is a sound due to an action of the person in the room;

an information generating computer that generates the information directed to evaluation of the room in terms of sound on the basis of a result of processing by the sound processing chip and by using information regarding the first sound including a sound level, a time, and a duration, and at least one of information regarding material of a building including the room, information regarding a structure of the building, and information regarding sound insulation performance of the building, and a display configured to display the evaluation of the room.

7. The information providing system according to claim 6, further comprising:

a device operating server that causes a device in the room to operate in response to a command from the person in the room; and a storage that stores the command received by the device operating unit, the sound processing chip recognizing a sound produced by the device that is caused to operate in accordance with the command from the person in the room on the basis of a time at which the sound is measured by the microphone and a time of the command stored in the storage.

* * * * *